(12) United States Patent
Okada

(10) Patent No.: US 8,850,118 B2
(45) Date of Patent: Sep. 30, 2014

(54) CIRCUIT AND METHOD FOR DYNAMICALLY CHANGING REFERENCE VALUE FOR ADDRESS COUNTER BASED ON CACHE DETERMINATION

(75) Inventor: Kazuhiko Okada, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 283 days.

(21) Appl. No.: 13/232,418

(22) Filed: Sep. 14, 2011

(65) Prior Publication Data

US 2012/0084513 A1 Apr. 5, 2012

(30) Foreign Application Priority Data

Oct. 1, 2010 (JP) ................................. 2010-223942

(51) Int. Cl.
*G06F 12/00* (2006.01)
*G06F 12/08* (2006.01)

(52) U.S. Cl.
CPC .... *G06F 12/0862* (2013.01); *G06F 2212/6022* (2013.01)
USPC ................................ 711/118; 711/137; 711/3

(58) Field of Classification Search
CPC ... G06F 12/802; G06F 12/0862; G06F 12/08; G06F 12/10
USPC .............................................. 711/118, 137, 3
See application file for complete search history.

(56) References Cited

U.S. PATENT DOCUMENTS

| 8,332,568 B2 * | 12/2012 | Okada ............................... 711/3 |
| 2007/0214325 A1 | 9/2007 | Sasamoto |
| 2008/0229071 A1 | 9/2008 | Shioya et al. |
| 2009/0024835 A1 * | 1/2009 | Fertig et al. .................... 712/207 |
| 2010/0030970 A1 * | 2/2010 | Qureshi ......................... 711/128 |
| 2010/0217914 A1 * | 8/2010 | Okada ............................... 711/3 |

FOREIGN PATENT DOCUMENTS

| JP | 9-259040 | 10/1997 |
| JP | 2007-241927 A | 9/2007 |
| JP | 2008-225915 A | 9/2008 |
| JP | 2008-310741 A | 12/2008 |

* cited by examiner

*Primary Examiner* — Hong Kim
(74) *Attorney, Agent, or Firm* — Fujitsu Patent Center

(57) ABSTRACT

A memory access determination circuit includes a counter that switches between a first reference value and a second reference value in accordance with a control signal to generate a count value based on the first reference value or the second reference value. A controller performs a cache determination based on an address that corresponds to the count value and outputs the control signal in accordance with the cache determination. A changing unit changes the second reference value in accordance with the cache determination.

12 Claims, 21 Drawing Sheets

Fig.6A

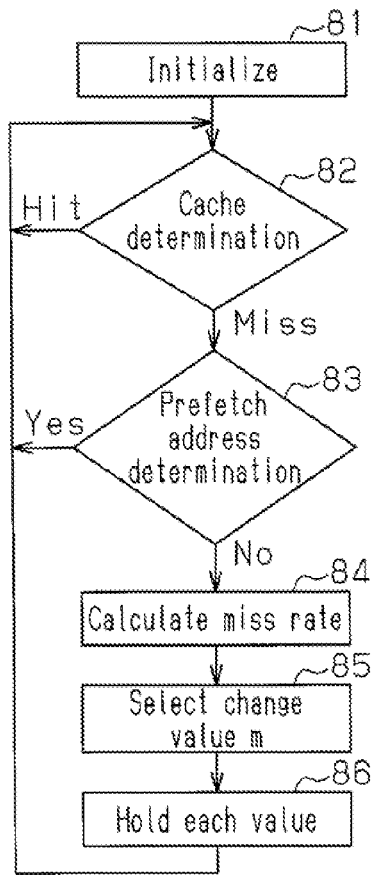

Fig.6B

| Difference Value | Change Value m |
|---|---|
| ±0.5% or less | select same value |
| +0.5<value≤+1.0 | dir=1: select value less than Bm by 1 stage<br>dir=0: select value greater than Bm by 1 stage |
| −1.0≤value<−0.5 | dir=1: select value greater than Bm by 1 stage<br>dir=0: select value less than Bm by 1 stage |
| +1.0<value≤+8.0 | dir=1: select value less than Bm by 2 stages<br>dir=0: select value greater than Bm by 2 stages |
| −8.0≤value<−1.0 | dir=1: select value greater than Bm by 2 stages<br>dir=0: select value less than Bm by 2 stages |
| greater than +8.0 | dir=1: select value less than Bm by 3 stages<br>dir=0: select value greater than Bm by 3 stages |
| less than −8.0 | dir=1: select value greater than Bm by 3 stages<br>dir=0: select value less than Bm by 3 stages |

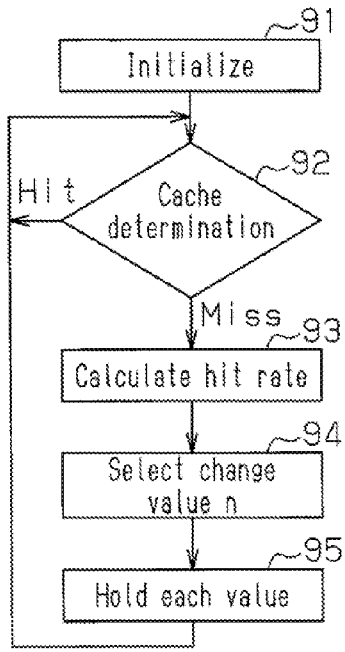

| Difference Value | Change Value m |
|---|---|
| ±0.5% or less | select same value |
| +0.5<value≤+1.0 | dir=1: select value less than Bn by 1 stage<br>dir=0: select value greater than Bn by 1 stage |
| −1.0≤value<−0.5 | dir=1: select value greater than Bn by 1 stage<br>dir=0: select value less than Bn by 1 stage |
| +1.0<value≤+8.0 | dir=1: select value less than Bn by 2 stages<br>dir=0: select value greater than Bn by 2 stages |
| −8.0≤value<−1.0 | dir=1: select value greater than Bn by 2 stages<br>dir=0: select value less than Bn by 2 stages |
| greater than +8.0 | dir=1: select value less than Bn by 3 stages<br>dir=0: select value greater than Bn by 3 stages |
| less than −8.0 | dir=1: select value greater than Bn by 3 stages<br>dir=0: select value less than Bn by 3 stages |

Fig.16A

| CT | Pixel | Address | Ln |
|----|-------|---------|-----|
| 0 | 72 | 72-75 | 0 |
| 1 | 73 | Hit | 0 |
| 2 | 74 | Hit | 0 |
| 3 | 75 | Hit | 0 |
| 4 | 104 | 104-107 | 1 |
| 5 | 105 | Hit | 1 |
| 6 | 106 | Hit | 1 |
| 7 | 107 | Hit | 1 |
| 8 | 136 | 136-139 | 2 |
| 9 | 137 | Hit | 2 |
| 10 | 138 | Hit | 2 |
| 11 | 139 | Hit | 2 |
| 12 | 168 | 168-171 | 3 |
| 13 | 169 | Hit | 3 |
| 14 | 170 | Hit | 3 |
| 15 | 171 | Hit | 3 |
| 16 | 200 | 200-203 | 4 |
| 17 | 201 | Hit | 4 |
| 18 | 202 | Hit | 4 |
| 19 | 203 | Hit | 4 |
| 20 | 232 | 232-235 | 5 |
| 21 | 233 | Hit | 5 |
| 22 | 234 | Hit | 5 |
| 23 | 235 | Hit | 5 |
| 24 | 264 | 264-267 | 6 |
| 25 | 265 | Hit | 6 |
| 26 | 266 | Hit | 6 |
| 27 | 267 | Hit | 6 |
| 28 | 296 | 296-299 | 7 |
| 29 | 297 | Hit | 7 |
| 30 | 298 | Hit | 7 |
| 31 | 299 | Hit | 7 |

Fig.16B

| CT | Pixel | Address | Ln |
|----|-------|---------|-----|
| 0 | 0 | 0-3 | 0 |
| 1 | 0 | Hit | 0 |
| 2 | 1 | Hit | 0 |
| 3 | 1 | Hit | 0 |
| 4 | 0 | Hit | 0 |
| 5 | 0 | Hit | 0 |
| 6 | 1 | Hit | 0 |
| 7 | 1 | Hit | 0 |
| 8 | 32 | 32-35 | 1 |
| 9 | 32 | Hit | 1 |
| 10 | 33 | Hit | 1 |
| 11 | 33 | Hit | 1 |
| 12 | 32 | Hit | 1 |
| 13 | 32 | Hit | 1 |
| 14 | 33 | Hit | 1 |
| 15 | 33 | Hit | 1 |
| 16 | 64 | 64-67 | 2 |
| 17 | 64 | Hit | 2 |
| 18 | 65 | Hit | 2 |
| 19 | 65 | Hit | 2 |
| 20 | 64 | Hit | 2 |
| 21 | 64 | Hit | 2 |
| 22 | 65 | Hit | 2 |
| 23 | 65 | Hit | 2 |
| 24 | 96 | 96-99 | 3 |
| 25 | 96 | Hit | 3 |
| 26 | 97 | Hit | 3 |
| 27 | 97 | Hit | 3 |
| 28 | 96 | Hit | 3 |
| 29 | 96 | Hit | 3 |
| 30 | 97 | Hit | 3 |
| 31 | 97 | Hit | 3 |

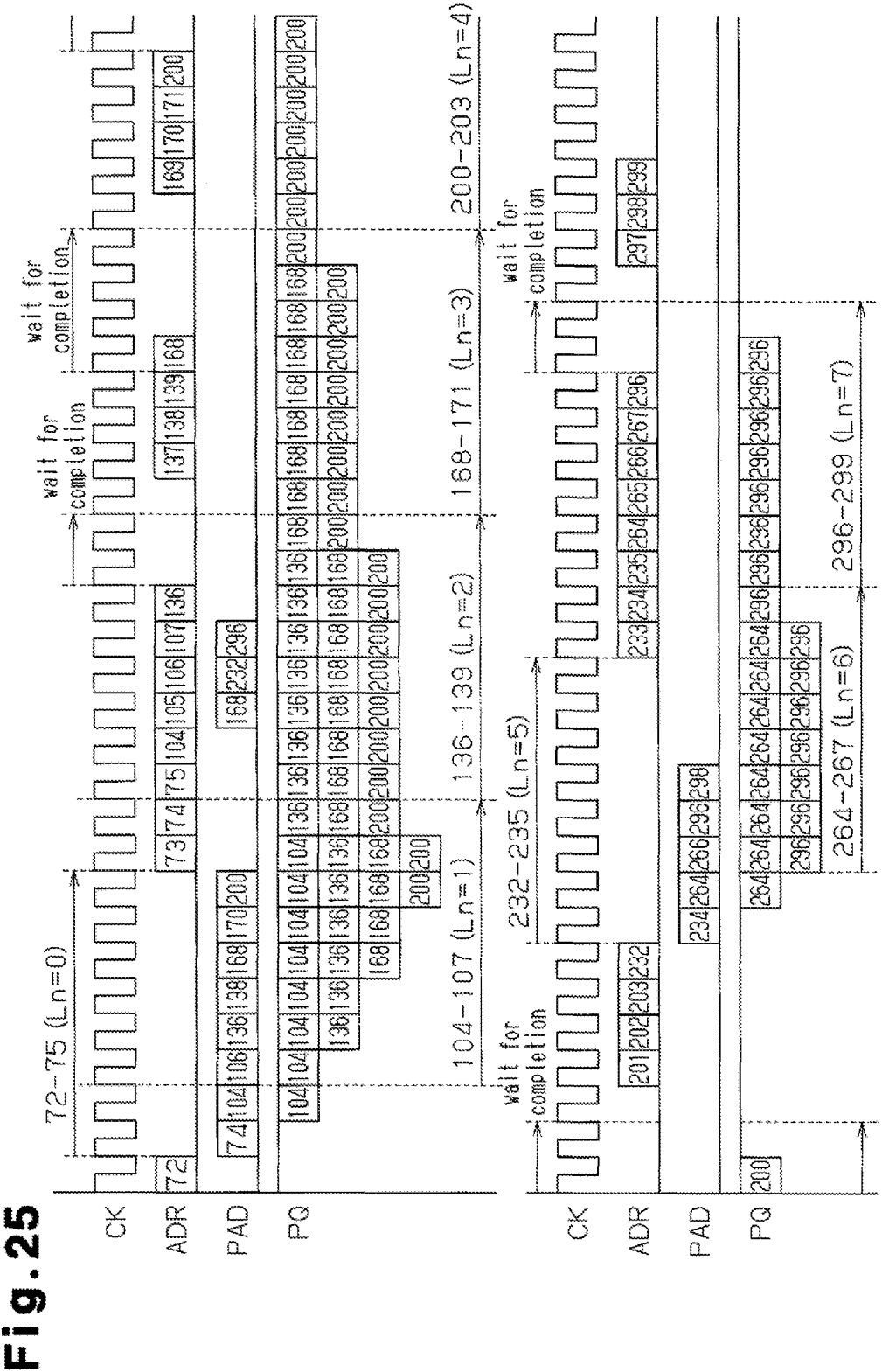

CIRCUIT AND METHOD FOR DYNAMICALLY CHANGING REFERENCE VALUE FOR ADDRESS COUNTER BASED ON CACHE DETERMINATION

CROSS-REFERENCE TO RELATED APPLICATIONS

This application is based upon and claims the benefit of priority from prior Japanese Patent Application No. 2010-223942, filed on Oct. 1, 2010, the entire contents of which are incorporated herein by reference.

FIELD

The present embodiment relates to a circuit and method for determining memory access, a cache controller, and an electronic device.

BACKGROUND

A cache memory device known in the art that includes a main memory and a cache memory prefetches data at a prefetch address from the main memory to the cache memory. Japanese Laid-Open Patent Publication No. 9-259040 describes a cache memory device including an address calculation circuit. The address calculation circuit determines a prefetch address based on cache control information that is added to data.

However, when cache control information is added to data, the memory requires extra capacity for the added data. Thus, even though the speed of cache determinations may be increased, the efficiency for accessing the memory is reduced. This decreases the data processing speed. Further, data containing cache control information is generated under the assumption that it will be accessed by a processor. Thus, such data is not versatile.

SUMMARY

According to one aspect, a memory access determination circuit includes a counter that switches between a first reference value and a second reference value in accordance with a control signal and generates a count value based on the first reference value or the second reference value. A controller performs a cache determination based on an address corresponding to the count value and outputs the control signal in accordance with the cache determination. A changing unit changes the second reference value in accordance with the cache determination.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory and are not restrictive of the invention, as claimed.

BRIEF DESCRIPTION OF DRAWINGS

The embodiments, together with objects and advantages thereof, may best be understood by reference to the following description of the presently preferred embodiments together with the accompanying drawings in which:

FIGS. 6A and 6B are diagrams illustrating a process for changing a reference value m;

FIGS. 7A and 7B are diagrams illustrating a process for changing a reference value n;

FIGS. 16A and 16B are diagrams illustrating memory access;

FIG. 25 is a chart illustrating the operation of a comparison example.

DESCRIPTION OF EMBODIMENTS

One embodiment will now be described with reference to the drawings.

[Configuration of Electronic Device]

Figure 1:
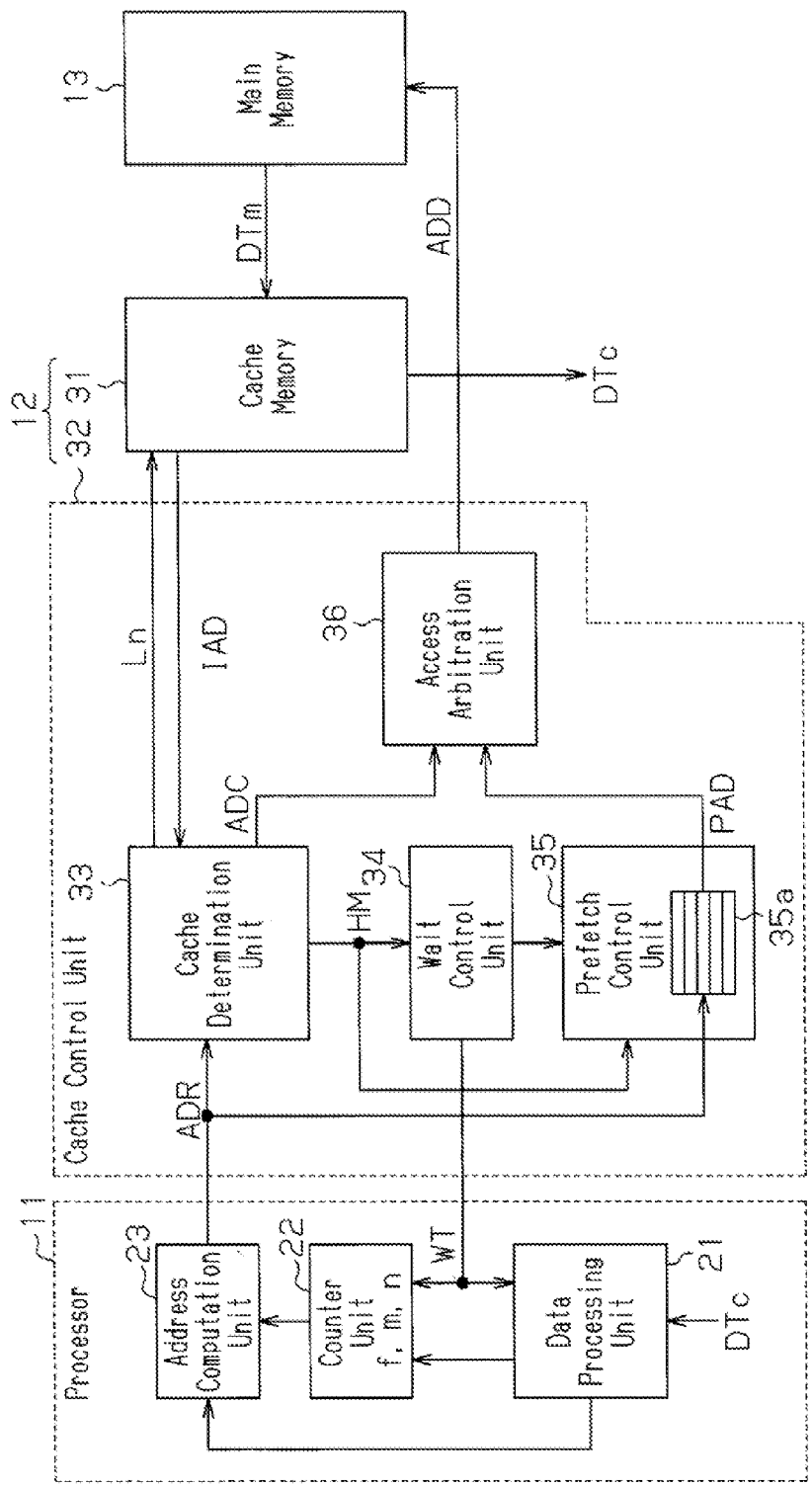
FIG. 1 is a schematic diagram of an electronic device.

As illustrated in FIG. 1, an electronic device includes a processor 11, a cache 12, and a main memory 13.

The processor 11 accesses the main memory 13 via the cache 12. The main memory 13 is a memory that requires time from when it starts accessing a memory to when it outputs the data, such as a synchronous dynamic random access memory (SDRAM). In this configuration, the processor 11 performs given processing on the data read from the main memory 13 and stores the processed data in the main memory 13 or outputs the processed data to an external circuit.

The cache 12 includes a memory 31 (hereinafter referred to as cache memory) which is higher in processing speed than the main memory 13. The cache memory 31 may be, for example, a static random access memory (SRAM). The cache 12 stores, in the cache memory 31, data from the main memory 13 (read data/write data) that the processor 11 has accessed in the past. A case in which data corresponding to an address output from the processor 11 is stored in the cache memory 31 is referred to as a "cache hit". A case in which such data is not stored in the cache memory 31 is referred to as a "cache miss". The cache 12 makes a cache determination on whether there has been a cache hit or a cache miss based on the address output from the processor 11. When there is a cache hit, the cache 12 provides the processor 11 with the data stored in the cache memory 31. In this manner, when there is a cache hit, in response to an access request from the processor 11, data is transferred between the processor 11 and the cache 12. This increases the data accessing speed of the processor 11.

When there is a cache miss, the cache 12 performs cache processing together with prefetch processing. In the cache processing, the cache 12 reads, from the main memory 13, data corresponding to the address ADR at which it has been determined that a cache miss occurred, and stores the data in the cache memory 31. For example, the cache 12 reads, from the main memory 13, data for a single line of the cache memory 31 from the address at which it has been determined that a cache miss occurred, and stores the data in the cache memory 31. In this manner, a plurality of bytes (e.g., 64 bytes) of data specified by consecutive addresses starting from the address at which the cache miss occurred is stored in one line of the cache memory 31.

In the prefetch processing, the cache 12 reads data, which may possibly be read from the main memory 13 after the data at the address ADR determined that a cache miss has occurred, before accessed by the processor 11 and stores the data in the cache memory 31. An address of the data required by the processor 11 for processing may be calculated in accordance with contents of the processing and the structure of the data. Accordingly, the processor 11 calculates the address for the data that is expected to be required as a prefetch address.

The cache 12 provides the processor 11 with a wait signal WT when determining that a cache miss has occurred. In response to the wait signal WT, the processor 11 generates a prefetch address. When data of the prefetch address is not present in the cache memory 31, the cache 12 reads the data of the prefetch address from the main memory 13 and stores the data in the cache memory 31. In this manner, the data prefetch processing is performed based on the prefetch address output from the processor 11. That is, data is prefetched at an address that will be accessed by the processor 11 in the near future. This improves the hit rate of the cache memory 31.

The processor 11 includes a data processing unit 21, a counter unit 22, and an address computation unit 23. The cache 12 includes the cache memory 31 and a cache control unit 32. The cache control unit 32 is one example of a cache controller.

The data processing unit 21 in the processor 11 outputs an access request signal and thus functions to gain access to the main memory 13. Further, the data processing unit 21 functions to process data read from the main memory 13. Further, the data processing unit 21 functions to set initial data when accessing the main memory 13.

The data processing unit 21 sets initial data for the counter unit 22 and the address computation unit 23. The initial data for the counter unit 22 contains an amount of change (increment value) for incrementing by the counter unit 22. The initial data for the address computation unit 23 contains a reading start position in a region of the main memory 13 (e.g., region start address) in which the data subject to processing is stored.

In response to a clock signal CK, the counter unit 22 adds the amount of change (increment value) to a count value CT and outputs the sum as a new count value CT. The amount of change (increment value) set for the counter unit 22 contains three reference values f, m, and n. The counter unit 22 switches the reference values f, m, and n based on the wait signal WT output from the cache 12 and updates the count value CT based on the switched reference value.

The reference values f, m, and n each correspond to a number of cycles. In other words, a count value calculated by the counter unit 22 is used to obtain an address for the data that is required after a certain number of cycles that corresponds to the reference value. The counter unit 22 outputs the count value CT to the address computation unit 23.

When there is a cache miss, the cache control unit 32 in the cache 12 asserts the wait signal WT. Then, when the data of an address that caused the wait signal WT to be asserted is read from the main memory 13 and stored in the cache memory 31, the cache control unit 32 negates the wait signal WT.

When the wait signal WT is being negated, the counter unit 22 outputs a count value CT based on the reference value f. In the present example, the counter unit 22 adds the reference value f to the count value CT and outputs the sum as a new count value CT. Thus, the count value CT is incremented by the reference value f for each cycle based on the clock signal CK.

When the wait signal WT is being asserted, the counter unit 22 outputs a count value CT based on the reference value m or n. In the present example, the counter unit 22 adds the reference value m to the count value CT in the first cycle in which the wait signal WT has been asserted, and outputs the sum as a new count value CT. Then, in a second cycle after the assertion of the wait signal WT and subsequent cycles, the counter unit 22 adds the reference value n to the count value CT and outputs the sum as a new count value CT. Thus, the count value CT is incremented by the reference value m in response to the clock signal CK in the first cycle after assertion of the wait signal WT and incremented by the reference value n in response to the clock signal CK in each of the subsequent cycles.

Figure 3:
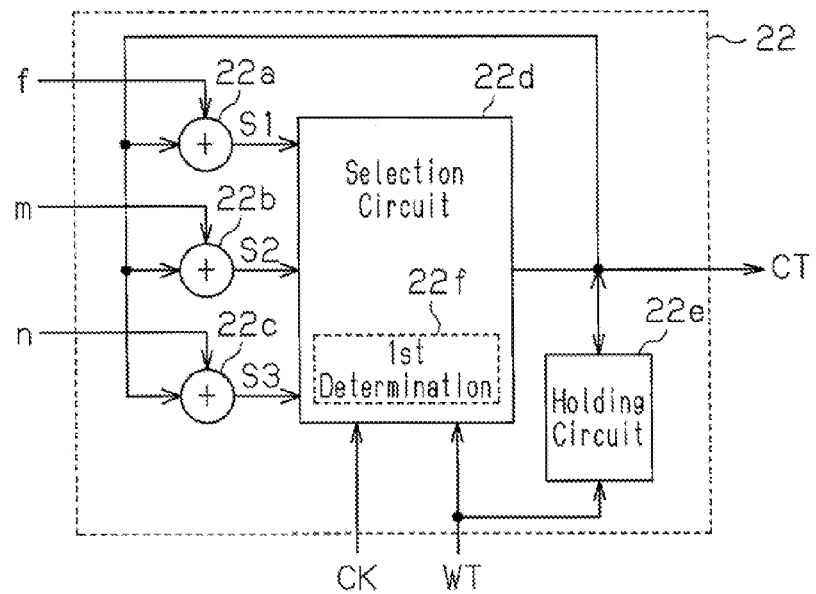
FIG. 3 is a block diagram of a counter unit.

An example of the configuration of the counter unit 22 will now be described. As illustrated in FIG. 3, the counter unit 22 includes adder circuits 22a to 22c, a selection circuit 22d, and a holding circuit 22e.

The adder circuit 22a is provided with the count value CT and the reference value f. The reference value f is, for example, "1". The adder circuit 22a adds the reference value f (=1) to the count value CT and outputs the sum S1. The adder circuit 22b is provided with the count value CT and the reference value m. The adder circuit 22b adds the reference value m to the count value CT and outputs the sum S2. The adder circuit 22c is provided with the count value CT and the reference value n. The adder circuit 22c adds the reference value n to the count value CT and outputs the sum S3.

The selection circuit 22d includes a first determination circuit 22f (indicated as "1st determination"). The first determination circuit 22f determines the first cycle in which the wait signal WT has been asserted. The selection circuit 22d selects the output value S1 of the adder circuit 22a based on the wait signal WT and outputs the output value S1 as the count value CT. Further, based on the determination result of the first determination circuit 22f, the selection circuit 22d selects the output value S2 of the adder circuit 22b in the first cycle in which the wait signal WT has been asserted and outputs the output value S2 as the count value CT. Moreover, based on the determination result of the first determination circuit 22f, the selection circuit 22d selects the output value S3 of the adder circuit 22c in each of the cycles excluding the first one in which the wait signal WT has been asserted and outputs the output value S3 as the count value CT.

The holding circuit 22e holds the present count value CT when the wait signal WT has been asserted and outputs the held count value CT when the wait signal WT has been negated. When the wait signal WT is being negated, the holding circuit 22e increments the count value CT based on the reference value f.

Figure 4:
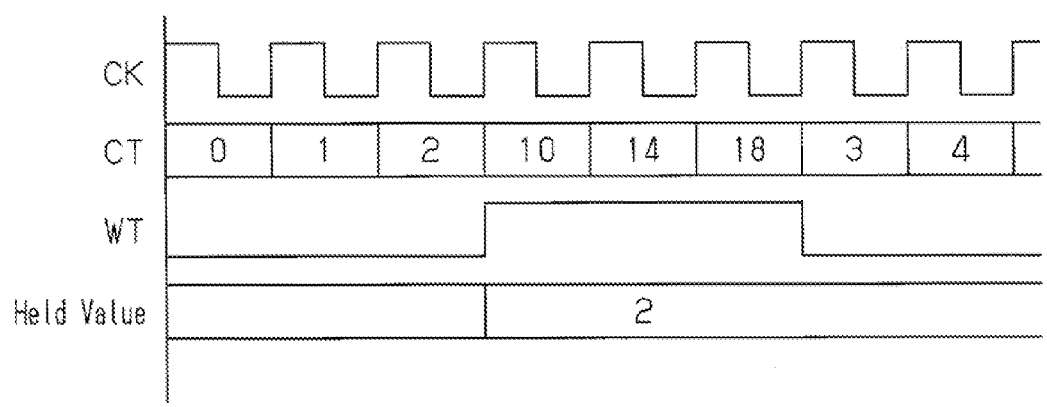
FIG. 4 is a chart illustrating the operation of the counter unit.

In one example, as illustrated in FIG. 4, the initial value of the count value CT is set to "0". Further, the reference values f, m, and n are set to, for example, "1", "8", and "4" respectively.

When the wait signal WT is being negated, the count value CT is incremented each time by the reference value f, that is, "1" based on the reference value f. When the wait signal WT has been asserted, the holding circuit 22e holds the current count value CT (2 in FIG. 4).

Accordingly, the count value CT in the first cycle in which the wait signal WT has been asserted is updated to 10 (=2+8) based on the reference value m (=8). Then, in the next cycle, the count value CT is updated to 14 (=10+4) based on the reference value n (=4). Further, in the following cycle, the count value CT is updated to 18 (=14+4) based on the reference value n. Then, when the wait signal WT is negated, the count value CT is updated to 3 (=2+1) based on the value (=2) held in the holding circuit 22e of FIG. 3 and the reference value f (=1).

Referring to FIG. 1, the address computation unit 23 obtains an address (read address) for accessing the main memory 13 based on the initial data (start position) received from the data processing unit 21 and the count value CT received from the counter unit 22. For example, the address computation unit 23 obtains an address (read position) from the count value by using a computing equation indicating the corresponding relationship between the count value and the address. Then, the address computation unit 23 adds the read position to the start position to generate the read address. The computing equation is set beforehand in the address computation unit 23. The address computation unit 23 outputs the generated read address ADR to the cache 12. The address computation unit 23 may obtain an address corresponding to the count value by referring to a lookup table that indicates the corresponding relationship between the count value and the address. In this case, the lookup table is set beforehand in the address computation unit 23. The address computation unit 23 outputs the address ADR to the cache 12.

The computing equation and the lookup table are set in accordance with the processing performed on the data stored in the main memory 13. For example, partial enlargement processing (zoom processing) performed on an image may be given as one example of the processing performed on the image data stored in the main memory 13. In this case, image data in a given region is read, and the amount of the image data (the number of pixels) is increased. The simplest way to increase the number of pixels is to read one pixel and arrange the same pixel beside it to form two pixels. That is, the same address in the same line is accessed twice so that the image data read in each access, that is, two pixels are stored respectively for two addresses. This increases the number of pixels in a single line by two times. This processing is performed twice on the same line (data storage is performed at different addresses) thereby converting one line into two lines. The processing converts the number of pixels in each the vertical and horizontal direction by two times.

In such processing, the image data of one pixel is accessed four times. Thus, the computing equation or lookup table described above is set to generate addresses for accessing the image data of one pixel for a number of times.

Another processing is binarization processing. In this case, pixels contained in image data are read sequentially, and values corresponding to results of comparisons between the read pixels and a threshold value are stored in the main memory 13. To process each pixel, addresses used in this processing are set so that the pixels contained in the image data are sequentially read. That is, the computing equation or lookup table is set so that each pixel is read once.

As described above, the cache 12 includes the cache memory 31 and the cache control unit 32. The cache memory 31 includes a plurality of (e.g., eight) lines, with each line having a given capacity (e.g., 64 bytes). Each line stores the data of consecutive addresses in accordance with its capacity. The cache memory 31 stores the number of each line in association with the address information of data stored in the line.

The cache memory 31 provides the data processing unit 21 with data DTc, which corresponds to a line number Ln received from the cache control unit 32. Further, the cache memory 31 stores data DTm, which is read from the main memory 13 based on the address from the cache control unit 32, and outputs the data DTm to the data processing unit 21 as data DTc.

[Configuration of Cache Control Unit (1)]

The cache control unit 32 is configured to perform cache determination and control data prefetching. The configuration of the cache control unit 32 will now be described.

The cache control unit 32 includes a cache determination unit 33, a wait control unit 34, a prefetch control unit 35, and an access arbitration unit 36.

The cache determination unit 33 performs cache determination based on an address ADR received from the address computation unit 23. In the present example, the cache determination unit 33 acquires address information IAD, which corresponds to all of the data stored in the cache memory 31, from the cache memory 31. The cache determination unit 33 performs cache determination for the address ADR received from the address computation unit 23 based on the address information IAD received from the cache memory 31.

The address information IAD includes an address from the main memory 13 that stores the head of the data in a line of the cache memory 31, that is, the head address of the line. One line in the cache memory 31 stores data from the head address SAD to the end address EAD, which is obtained by adding the capacity of the line to the head address SAD. Accordingly, when the address ADR is included in a range from the head address SAD to the end address EAD, the data of the address ADR is stored in the line. When the address ADR is excluded from the range from the head address SAD to the end address EAD, the data of this address ADR is not stored in the line.

Accordingly, the cache determination unit 33 compares the address ADR received from the address computation unit 23 with address information IAD of each line and determines whether or not data in the address ADR is stored in the cache memory 31, that is, whether a cache hit has occurred or a cache miss has occurred. When a cache hit is determined, the cache determination unit 33 negates a determination signal HM (sets it to the L level, for example) and sends the corresponding line number Ln to the cache memory 31. On the other hand, when a cache miss is determined, the cache determination unit 33 asserts the determination signal HM (sets it to the H level, for example) and sends the address ADR at which it is determined that the cache miss has occurred to the access arbitration unit 36 as a memory access request (request address ADC).

When the determination signal HM is asserted, the wait control unit 34 asserts the wait signal WT and instructs the prefetch control unit 35 to enter a prefetch address. The wait signal WT is held in the asserted state until the data of the address that caused the wait signal WT to be asserted is read from the main memory 13 and stored in the cache memory 31. When the data of the address that caused the wait signal WT to be asserted is stored in the cache memory 31, the wait signal WT is negated. When the wait signal WT is asserted, entry of the prefetch address is instructed. When the wait signal WT is negated, entry of the prefetch address is not instructed.

The prefetch control unit 35 controls prefetch operations. When the determination signal HM is asserted and an instruction is given to enter a prefetch address, the prefetch control unit 35 stores an address ADR output from the address computation unit 23 in an address buffer 35a as a prefetch address. The prefetch control unit 35 sends the prefetch addresses stored in the prefetch address buffer 35a to the access arbitration unit 36 as prefetching memory access requests in the order they were stored. As the prefetch address buffer 35a, a first-in first-out (FIFO) type memory is used, for example.

When, for example, a memory access request from the cache determination unit 33 competes with a prefetching memory access request from the prefetch address buffer 35a, the access arbitration unit 36 gives priority to the memory access from the cache determination unit 33. This readily reads the data required by the data processing unit 21 from the main memory 13 and store the data in the cache memory 31. Thus, instead of giving priority to memory access with the prefetch address, the processing speed of the data processing unit 21 is increased. The prefetching memory access request is processed after the memory access request from the cache determination unit 33 is processed. Once a memory access request is received from the cache determination unit 33, the access arbitration unit 36 does not accept a new memory access request from the cache determination unit 33 until data transfer based on the memory access request ends.

Figure 5:
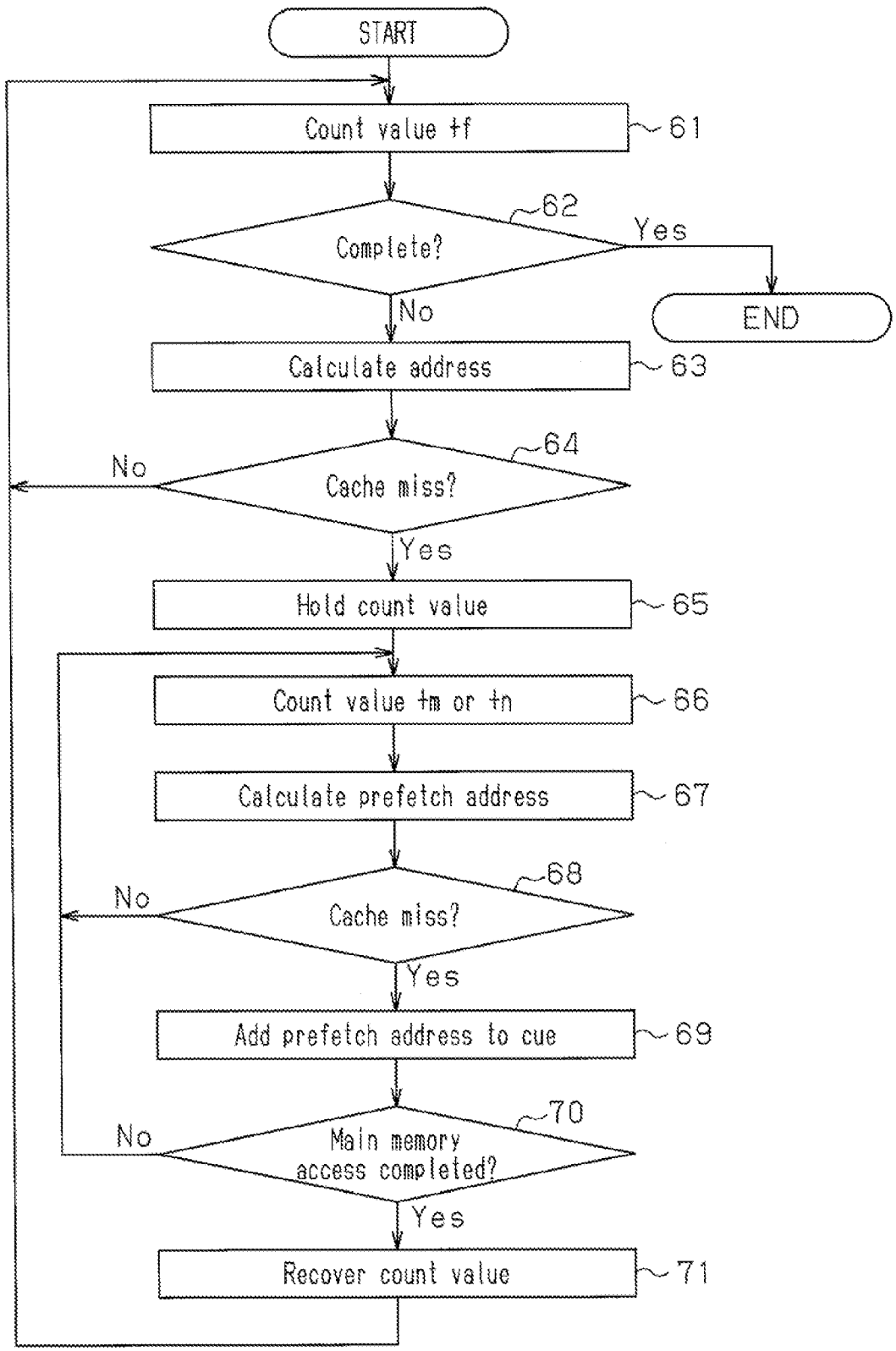
FIG. 5 is a flowchart of a memory access determination process.

The flow of cache determination processing and prefetch address control processing performed by an electronic device of the configuration described above will now be described with reference to FIG. 5.

First, the processor 11 starts counting using the reference value f (step 61).

Then, it is determined whether or not memory access determination processing has been completed (step 62). When the processing has been completed (Yes in step 62), the series of memory access determinations is ended. When the processing has not been completed (No in step 62), the processing proceeds to step 63.

The address computation unit 23 obtains an address ADR that corresponds to a count value CT by referring to a computing equation or a lookup table (step 63).

Next, the cache determination unit 33 performs a cache determination on an address ADR (step 64). When there is a cache hit (No in step 64), data of the address ADR is read from the cache memory 31 (see FIG. 1) and sent to the data processing unit 21. Then, the processing proceeds to step 61. When there is a cache miss (Yes in step 64), the counter unit 22 holds a count value CT (step 65). Further, the cache control unit 32 starts read processing on the address ADR at which it is determined that a cache miss has occurred. The read processing includes reading data for one line including the data at the address ADR from the main memory 13 and storing the data in the cache memory 31. Until the storing of data to the cache memory 31 is completed, the counter unit 22 performs counting based on the reference value m and generates the count value CT (step 66).

Then, the address computation unit 23 obtains a prefetch address that corresponds to the count value CT (step 67). The cache determination unit 33 performs a cache determination on the prefetch address (step 68). When the prefetch address is a cache hit (No in step 68), the counter unit 22 generates a count value CT based on the reference value m or the reference value n, the address computation unit 23 obtains a prefetch address in the same manner as described above, and the cache determination unit 33 performs cache determination (steps 66 to 68). When the prefetch address is a cache miss (Yes in step 68), the prefetch control unit 35 holds the prefetch address in the prefetch address buffer 35a (step 69).

Next, it is determined whether or not reading of data from the main memory 13, which is triggered by the cache miss determined in step 64, has been completed (step 70). When the reading of the data from the main memory 13 is not completed (No in step 70), the processing of step 66 to step 70 is repeated until the reading of data is completed. When the reading of data is completed (Yes in step 70), the counter unit 22 outputs the count value held in step 65 (step 71). Then, the processing proceeds to step 61.

[Configuration of Cache Control Unit (2)]

The cache 12 is configured to change the reference values m and n required to generate the count value CT when the wait signal WT is asserted. The configuration will be described below.

Figure 2:
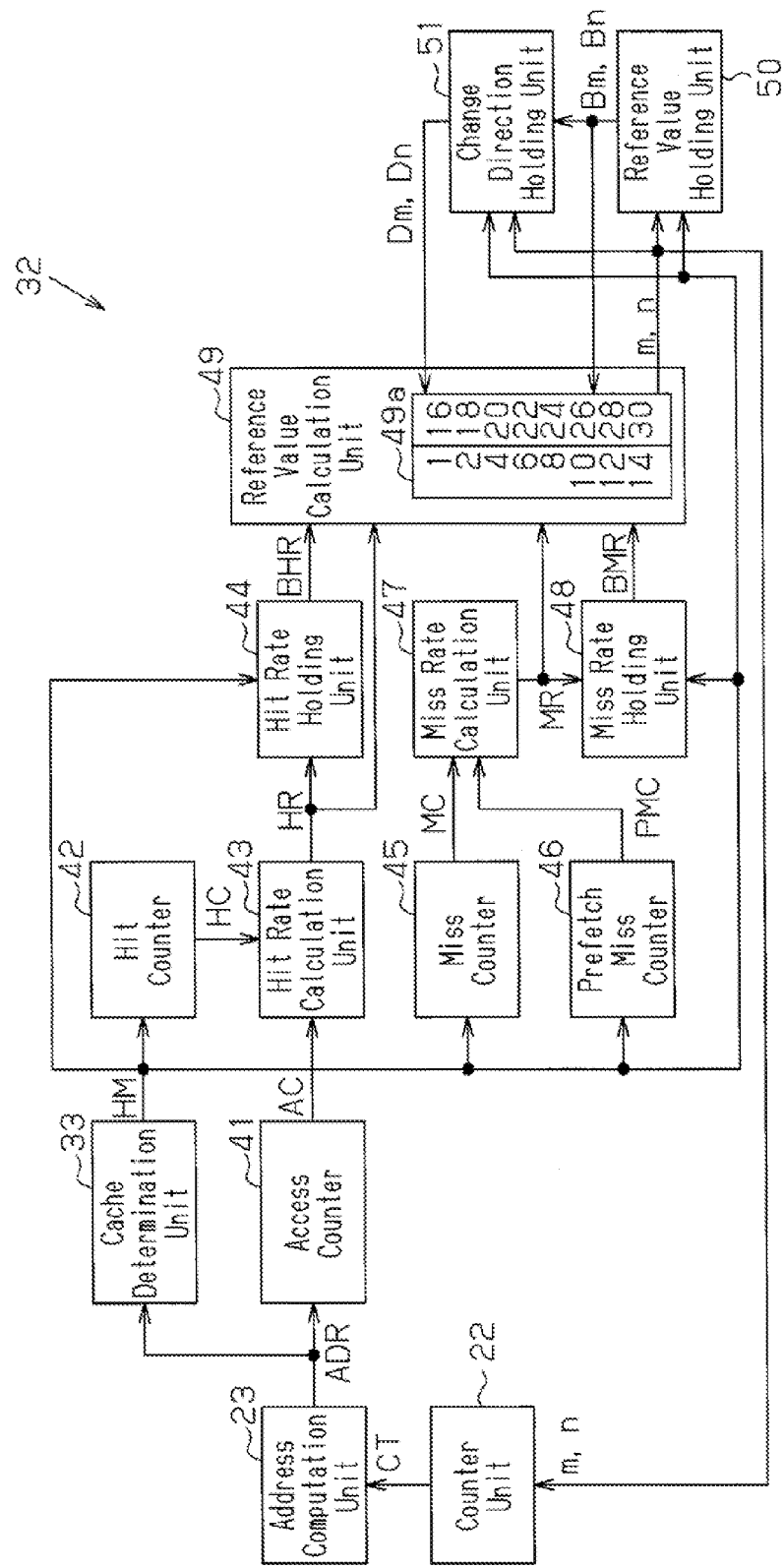
FIG. 2 is a block circuit diagram of a memory access determination circuit.

As illustrated in FIG. 2, the cache control unit 32 includes an access counter 41, a hit counter 42, a hit rate calculation unit 43, a hit rate holding unit 44, a miss counter 45, a prefetch miss counter 46, a miss rate calculation unit 47, a miss rate holding unit 48, a reference value calculation unit 49, a reference value holding unit 50, and a change direction holding unit 51.

The access counter 41 is provided with an address ADR. The access counter 41 counts the number of provided addresses ADR to generate a count value AC and outputs the count value AC to the hit rate calculation unit 43. The address ADR is provided from the address computation unit 23 of the processor 11 for access to the main memory 13. Thus, the count value AC indicates the number of times the cache memory 31 is accessed.

The determination signal HM output from the cache determination unit 33 is provided to the hit counter 42, the hit rate holding unit 44, the miss counter 45, the prefetch miss counter 46, the miss rate holding unit 48, the reference value holding unit 50, and the change direction holding unit 51.

Based on the determination signal HM, the hit counter 42 counts the number of times the determination signal HM is asserted, that is, the number of times it is determined that a cache hit occurred at an address ADR and then outputs the count value HC to the hit rate calculation unit 43.

The hit rate calculation unit 43 calculates the hit rate HR relative to the number of accesses based on the count value HC indicating the number of cache hits and the count value AC indicating the number of accesses. In the present example, the hit rate calculation unit 43 calculates the hit rate HR by with the next equation.

$$HR = (HC/AC) \times 100$$

The hit rate calculation unit 43 outputs the calculated hit rate HR to the hit rate holding unit 44 and the reference value calculation unit 49.

When the determination signal HM is negated, that is, when it is determined that a cache miss has occurred, the hit rate holding unit 44 holds the hit rate HR output from the hit rate calculation unit 43 and outputs the held value to the reference value calculation unit 49 as a before hit rate (BHR).

The miss counter 45 counts the number of times the determination signal HM is negated, that is, the number of determinations that a cache miss has occurred for an address ADR and outputs the count value MC to the miss rate calculation unit 47.

The prefetch miss counter 46 counts the number of times the first prefetch address is not cached, that is, the number of cache miss determinations, and outputs the count value PMC to the miss rate calculation unit 47.

The miss rate calculation unit 47 calculates a first prefetch miss rate (MR) based on the count value MC, which indicates the number of cache misses, and the count value PMC, which indicates number of cache misses at the first prefetch address. In the present example, the miss rate calculation unit 47 calculates the miss rate MR using the next equation.

$$MR=(PMC/MC)\times 100$$

Then, the miss rate calculation unit 47 outputs the calculated miss rate MR to the miss rate holding unit 48 and the reference value calculation unit 49.

When the determination signal HM is negated, that is, when it is determined that a cache miss has occurred, the miss rate holding unit 48 holds the miss rate MR output from the miss rate calculation unit 47 and outputs the held value to the reference value calculation unit 49 as the before miss rate (BMR).

The reference value calculation unit 49 is provided with before reference values Bm and Bn held by the reference value holding unit 50. Further, the reference value calculation unit 49 is provided with change direction values Dm and Dn held by the change direction holding unit 51. The reference value calculation unit 49 includes a reference value table 49a storing reference values m and n, which change. The reference value calculation unit 49 selects one of the values stored in the reference value table 49a based on the provided values and outputs the selected value as the reference value m. In the same manner, the reference value calculation unit 49 selects one of the values stored in the reference value table 49a based on the provided values and outputs the selected value as the reference value n.

For example, the reference value calculation unit 49 selects one of the values stored in the reference value table 49a based on the miss rate MR, the before miss rate BMR, the before reference value Bm, and the change direction value Dm and outputs the selected value as the reference value m. Further, the reference value calculation unit 49 selects one of the values stored in the reference value table 49a based on the hit rate HR, the before hit rate BHR, the before reference value Bn, and the change direction value Dn and outputs the selected value as the reference value n. The reference values m and n output from the reference value calculation unit 49 are provided to the reference value holding unit 50, the change direction holding unit 51, and the counter unit 22.

When the determination signal HM is negated, that is, when determined that a cache miss has occurred, the reference value holding unit 50 holds the reference values m and n output from the reference value calculation unit 49 as before reference values Bm and Bn, respectively. Then, the reference value holding unit 50 outputs the before reference values Bm and Bn to the reference value calculation unit 49 and the change direction holding unit 51.

The change direction holding unit 51 compares the reference values m and n, which are output from the reference value calculation unit 49, with the before reference values Bm and Bn, which are output from the reference value holding unit 50, based on the determination signal HM to calculate a direction in which each of the reference values m and n is changed and holds the calculated result. Then, the change direction holding unit 51 outputs the held change direction values Dm and Dn to the reference value calculation unit 49. For example, the change direction holding unit 51 subtracts the before reference value Bm from the reference value m and holds the direction value Dm as "0" when the subtraction result is positive and holds the direction value Dm as "1" when the subtraction result is negative. Further, when the subtraction result is "0", the change direction holding unit 51 holds a direction value Dm that corresponds to the previous computation result. In the same manner, the change direction holding unit 51 performs a computation on the reference value n to determine a direction value Dn.

Next, processing for changing the reference value m that is performed by the cache control unit 32 will be described with reference to FIGS. 6A and 6B.

First, the cache control unit 32 performs initialization processing (step 81). In the processing, the cache control unit 32 clears the before miss rate BMR in the miss rate holding unit 48 (BMR=0). Further, the cache control unit 32 sets the before reference value Bm in the reference value holding unit 50 to an initial value (e.g., "4") and the change direction value Dm in the change direction holding unit 51 to an initial value (e.g., "0").

Then, the cache determination unit 33 makes a cache determination on an address ADR (step 82). When there is a cache hit (Hit in step 82), step 82 is repeated. When there is a cache miss (Miss in step 82), it is determined whether or not a prefetch address has been cached (step 83). When the prefetch address has been cached (Yes in step 83), the processing proceeds to step 82.

When the prefetch address has not been cached (No in step 83), the miss rate calculation unit 47 calculates the first prefetch miss rate MR based on a count value MC of the miss counter 45 and a count value PMC of the prefetch miss counter 46 using the next equation (step 84).

$$MR=(PMC/MC)\times 100$$

Then, the reference value calculation unit 49 calculates a difference Δmr between the calculated miss rate MR and the before miss rate BMR, which is output from the miss rate holding unit 48, and selects one of the values in the table 49a (see FIG. 2) in accordance with a table illustrated in FIG. 6B based on the difference Δmr, the before reference value Bm, and the change direction value Dm (indicated as "dir" in FIG. 6B) (step 85). In this selection, a minimum value and a maximum value of the values in the table 49a are defined as a lower limit value and an upper limit value, respectively.

Subsequently, the change direction holding unit 51 subtracts the before reference value Bm from the selected reference value m and holds "0" as the change direction value Dm when the subtraction result is positive and holds "1" as the change direction value Dm when the subtraction result is negative. Further, when the subtraction result is "0", the previous change direction value Dm is held (step 86). As a result, the change direction holding unit 51 determines a direction in which the reference value m is changed, that is, whether the reference value m has increased, decreased, or is the same value as the one selected previously and holds the determination result. Further, in step 86, the calculated miss rate MR is held, and the selected reference value m is held as the before reference value Bm.

A change direction value Dm of "0" indicates that the reference value m was increased in the previous time of changing, and the change direction value Dm of "1" indicates that the reference value m was decreased in the previous time of changing. A positive difference Δmr indicates an increase in miss rate MR, and a negative difference Δmr indicates a decrease in miss rate MR.

The selection of a value that is greater than the before reference value Bm when the difference Δmr is negative and the change direction Dm is "1" means the selection of a value in a direction increasing the miss rate MR, which has been decreased by a decrease in the reference value m. The selection of a value less than the before reference value Bm when the difference Δmr is negative and the change direction Dm is "0" means the selection of a value in a direction increasing the miss rate MR, which has been decreased by an increase in the reference value m.

The selection of a value less than the before reference value Bm when the difference Δmr is positive and the change direction Dm is "1" means the selection of a value in a direction increasing the miss rate MR, which has been increased by a decrease in the reference value m. The selection of a value greater than the before reference value Bm when the difference Δmr is positive and the change direction Dm is "0" means the selection of a value in a direction increasing the miss rate MR, which has been increased by an increase in the reference value m.

In this manner, the reference value calculation unit 49 changes the reference value m so that the miss rate MR increases. The miss rate MR is the rate a prefetch address that is generated first is determined as a cache miss. That is, an increase in the miss rate of the prefetch address results in an increase in the hit rate.

Processing for changing the reference value n performed by the cache control unit 32 will now be described with reference to FIGS. 7A and 7B.

First, the cache control unit 32 performs initialization processing (step 91). In the processing, the cache control unit 32 clears the before hit rate BHR in the hit rate holding unit 44 (BHR=0). Further, the cache control unit 32 sets the before reference value Bn in the reference value holding unit 50 to an initial value (for example, "4") and the change direction value Dn in the change direction holding unit 51 to an initial value (for example, "0").

Subsequently, the cache determination unit 33 makes a cache determination on an address ADR (step 92). When a cache hit is determined (Hit in step 92), step 92 is repeated. When a cache miss is determined (Miss in step 92), the hit rate calculation unit 43 calculates the hit rate HR based on a count value AC of the access counter 41 and a count value HC of the hit counter 42 using the next equation (step 93).

$$HR=(HC/AC)\times 100$$

Next, the reference value calculation unit 49 calculates a difference Δhr between the calculated hit rate HR and the before hit rate BHR, which is output from the hit rate holding unit 44, and selects one of the values in the table 49a (see FIG. 2) in accordance with a table illustrated in FIG. 7B based on the difference Δhr, the before reference value Bn, and the change direction value Dn (indicated as "dir" in FIG. 7B) (step 94). In this selection, a minimum value and a maximum value of the values in the table 49a are defined as a lower limit value and an upper limit value, respectively.

Then, the change direction holding unit 51 subtracts the before reference value Bn from the selected reference value n and holds "0" as the change direction value Dn when the subtraction result is positive and holds "1" as the change direction value Dn when the subtraction result is negative. Further, when the subtraction result is "0", the previous change direction value Dn is held (step 95). As a result, the change direction holding unit 51 determines a direction in which the reference value n is changed, that is, whether the reference value n is increased, or decreased, or is the same value as the one selected previously and holds the determination result. Further, in step 95, the calculated hit rate HR is held, and the selected reference value n is held as the before reference value Bn.

A change direction value Dn of "0" indicates that the reference value n was increased in the previous time of changing, and a change direction value Dn of "1" indicates that the reference value n was decreased in the previous time of changing. A positive difference Δhr indicates an increase in the hit rate HR, and a negative difference Δhr indicates a decrease in hit rate HR.

The selection of a value greater than the before reference value Bn when the difference Δhr is negative and the change direction Dn is "1" means the selection of a value in a direction increasing the hit rate HR, which has been decreased by a decrease in the reference value n. The selection of a value less than the before reference value Bn when the difference Δhr is negative and the change direction Dn is "0" means the selection of a value in a direction increasing the hit rate HR, which has been decreased by an increase in the reference value n.

The selection of a value less than the before reference value Bn when the difference Δhr is positive and the change direction Dn is "1" means the selection of a value in a direction increasing the hit rate HR, which has been increased by a decrease in reference value n. The selection of a value greater than the before reference value Bn when the difference Δhr is positive and the change direction Dn is "0" means the selection of a value in a direction increasing the hit rate HR, which has been increased by an increase in reference value n.

In this manner, the reference value calculation unit 49 changes the reference value n so that the hit rate HR increases.

Accordingly, the reference value calculation unit 49 changes the reference values m and n based on the hit rate HR and the miss rate MR so that the hit rate HR in the cache memory 31 is increased and maintained in the increased state. A changing unit that changes the reference values m and n includes the hit rate calculation unit 43, the miss rate calculation unit 47, and the reference value calculation unit 49.

[Description of Operation]

The operation of the above electronic device will now be described. First, the cache determination and prefetch operation will be described.

<Operation when the Reference Values m and n are Fixed>

In one example, the reference value f is "1", the reference values m and n are "4". In this case, when the count values CT in the address computation unit 23 illustrated in FIG. 1 and the corresponding addresses ADR are indicated as "CT, ADR", they are indicated as "0, 0", "1, 16", "2, 32", "3, 48", "4, 64", "5, 80", "6, 96", "7, 112", "8, 128", "9, 144", and "10, 160".

Figure 8:
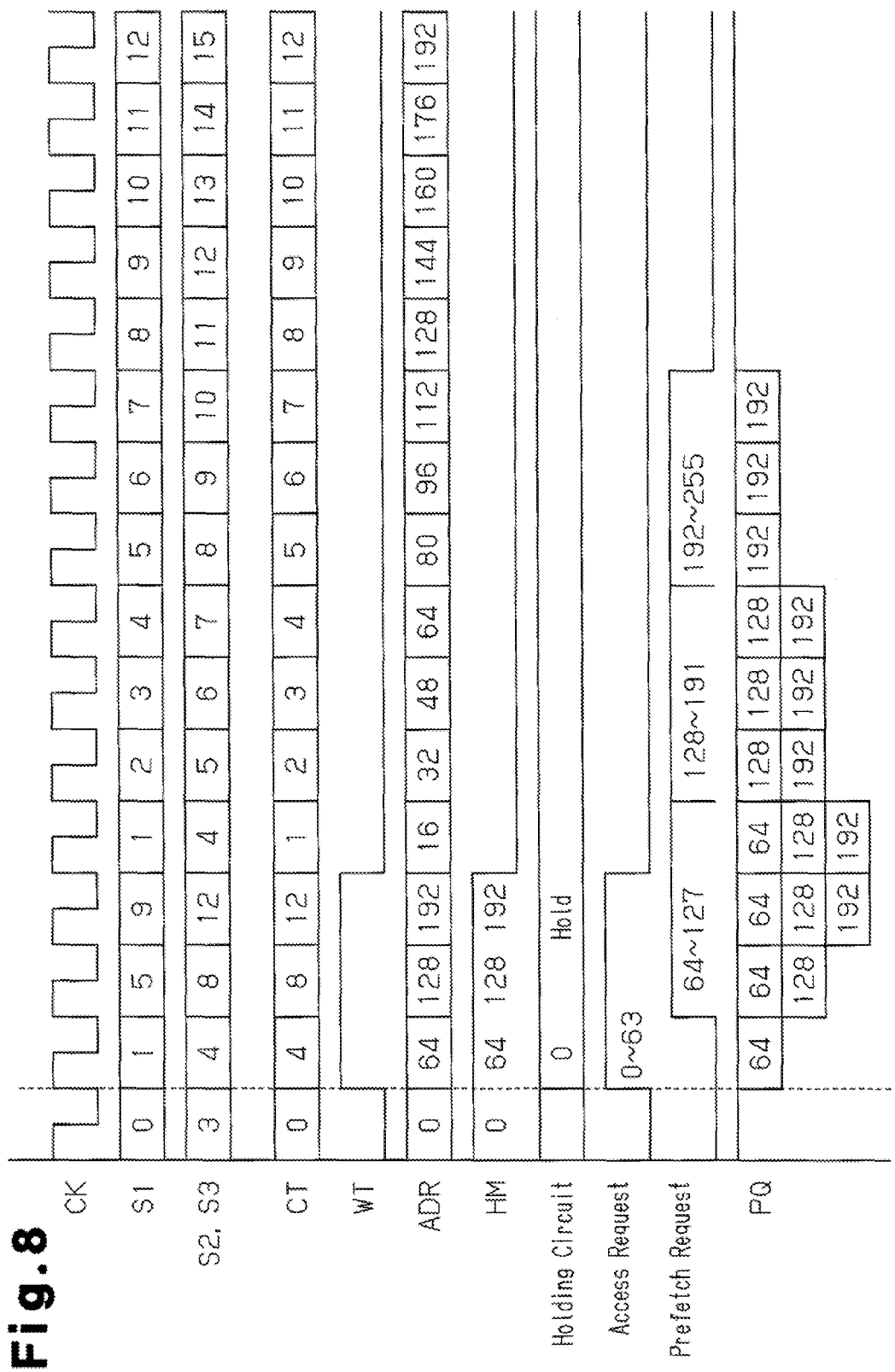
FIG. 8 is a chart illustrating the operation of the memory access determination circuit.

FIG. 8 is a chart illustrating the cache determination and prefetch operations. Here, each line in the cache memory 31 has a size of 64 bytes. Accordingly, there is one line number given to the cache memory 31 from the cache determination unit 33 upon occurrence of a cache hit for the address of every 64 bytes in the main memory 13. Further, the cache determination performed in 64-byte units. When a cache miss occurs, 64 bytes of data, which includes the data of the address at which it is determined that a cache miss has occurred, is read from the main memory 13 and stored in the cache memory 31.

Referring to FIG. 8, first, when the count value CT is "0", this indicates that nothing is stored in the cache memory 31.

Thus, it is determined that a cache miss has occurred at address "0". This causes data corresponding to addresses ADR "0 to 63" to be read from the main memory 13 and stored in the cache memory 31. During the period the data corresponding to addresses ADR "0 to 63" is read from the main memory 13 and stored in the cache memory 31, the reference value m (=4) is added to update the count value CT to "4". Accordingly, the address ADR becomes "64". Data corresponding to the address ADR "64" is not stored in the cache memory 31. Thus, it is determined that a cache miss occurred at address ADR "64". Then, the address ADR "64" is stored in the prefetch address buffer 35a. The prefetch control unit 35 requests read access to the addresses ADR "64 to 127".

Next, the reference value n (=4) is added to update the count value CT to "8". Subsequently, in the same manner, a cache miss occurs and the address ADR "128" is stored in the prefetch address buffer 35a. The prefetch control unit 35 requests read access to the addresses ADR "128 to 191". Then, the count value CT is updated to "12". Subsequently, a cache miss occurs in the same manner and the address ADR "192" is stored in the prefetch address buffer 35a. The prefetch control unit 35 requests read access to the addresses ADR "192 to 255". Here, the storage of data corresponding to the addresses ADR "0 to 63" in the cache memory 31 is completed. The count value CT returns to "0" and the count value (=0) is added to the reference value f (=1) so that the new count value CT becomes "1".

The address ADR corresponding to a count value CT of "1" is "16". Data corresponding to address ADR "16" has been stored in the cache memory 31. Thus, address ADR "16" is a cache hit. The address ADR corresponding to a count value CT of "2" is "32" and the address ADR corresponding to a count value CT of "3" is "48". Thus, it is determined that both addresses are cache hits. The address ADR corresponding to a count value CT of "4" is "64". Here, data corresponding to address ADR "64", which is stored in the prefetch address buffer 35a, has been read from the main memory 13 and stored in the cache determination unit 33. Thus, it is determined that address ADR "64" is a cache hit. Further, as for count values CT from "5", corresponding data has been read through prefetching from the main memory 13 and stored in the cache determination unit 33. Thus, it is determined that the corresponding address is a cache hit.

Figure 9:
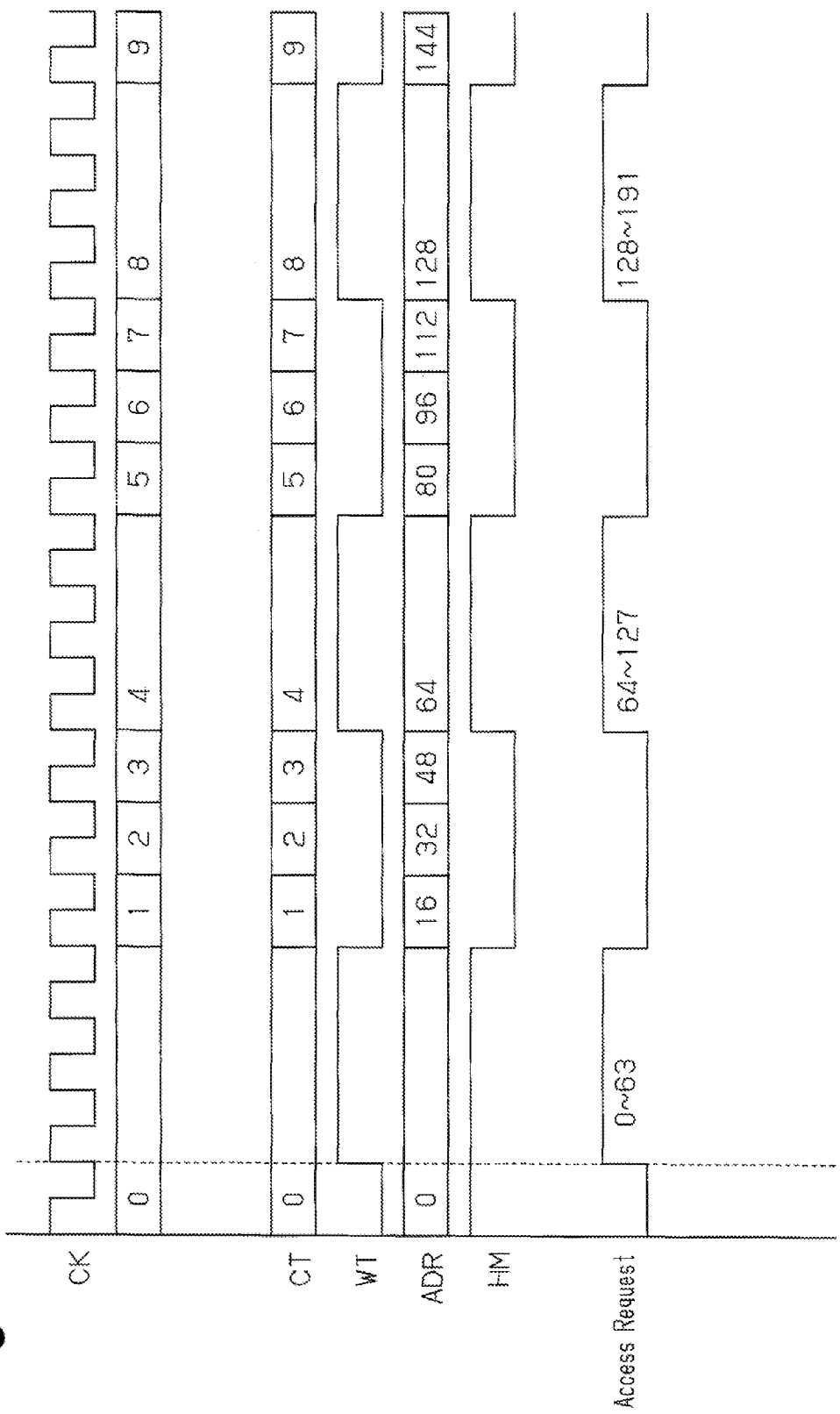
FIG. 9 is a chart illustrating the operation of a comparison example.

FIG. 9 is a chart of the operations of a comparison example. In the comparison example, no prefetch operations are performed with counting using the reference values m and n. The other conditions are the same as the example illustrated in FIG. 8. In the comparison example, data corresponding to a count value CT of "4" or "8" is read from the main memory and stored in the cache memory. This delays the processing. FIGS. 8 and 9 illustrate the same number of cycles (number of pulses of the clock signal CK). FIG. 8 illustrates the processing to the count value CT of "12", whereas FIG. 9 illustrates the processing to the count value CT of "9". As apparent from the comparison between FIGS. 8 and 9, the present embodiment is faster than the comparison example. Accordingly, the processing speed of the data processing unit 21 is increased.

<Operation Related with Changing the Reference Value>

As an example, there is one processing for rotating an image.

Figure 10:
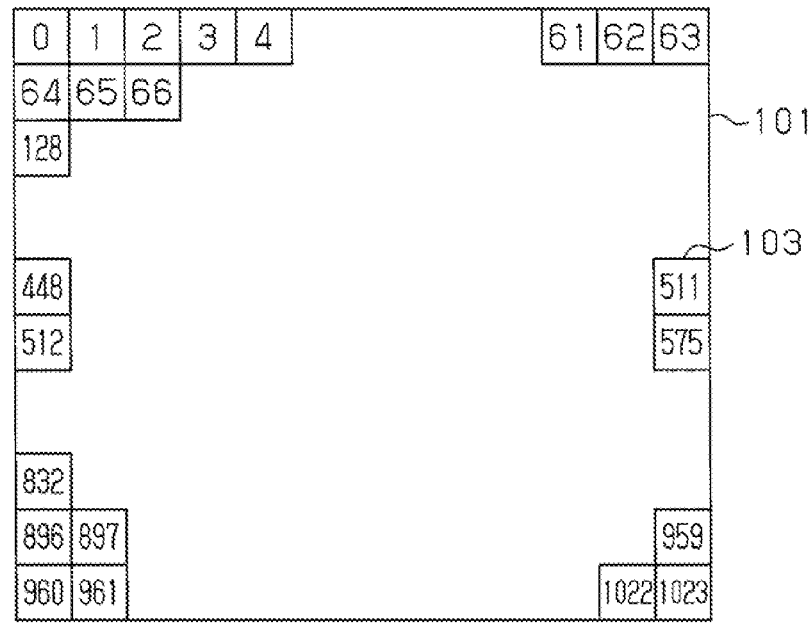
FIG. 10 is a diagram of an image subject to processing.
Figure 11:
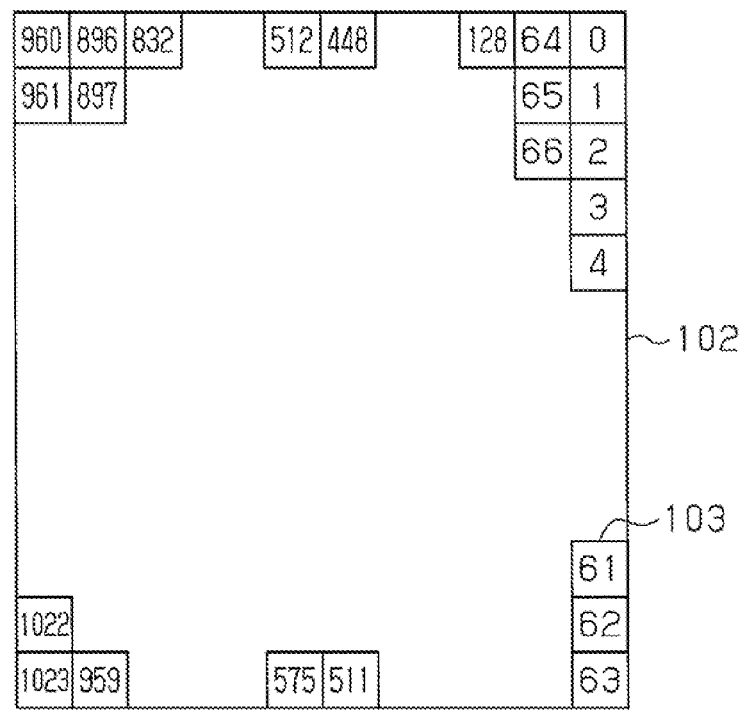
FIG. 11 is a diagram of an image subject to processing.

FIGS. 10 and 11 illustrate images 101 and 102 that are subject to processing.

In the example illustrated in FIG. 10, the large square represents the image 101 having a size of, for example, 64 pixels by 16 pixels. In the example illustrated in FIG. 11, the large square represents the image 102 having a size of, for example, 16 pixels by 64 pixels and is obtained by rotating the image 101 of FIG. 10 by 90 degrees in the clockwise direction. In both drawings, the small squares numbered 0 through 1023 each represent a pixel 103.

The cache memory 31 and the movement of addresses in the image processing illustrated in FIGS. 10 and 11 will now be described. In the horizontal direction of FIG. 11, data is written at every eight pixels in each line. For example, data is sequentially written in the horizontal direction from address "960" to address "512". Then, data is written to the next line from address "961".

Referring to FIGS. 10 and 11, when the count value CT and the corresponding address ADR in the image rotation processing are represented by "CT, ADR", they are indicated in pixel data storage order as "0, 960", "1, 896", "2, 832", "3, 768", "4, 704", "5, 640", "6, 576", "7, 512", "8, 448", "9, 384", and "10, 320"

Here, the initial value of the count value CT is "0". Further, the size of the data corresponding to a single pixel 103 is one byte. Further, each line of the cache memory 31 has 64 bytes, and the cache memory 31 has a capacity of 512 bytes. Accordingly, the cache memory 31 is capable of storing eight lines of data.

First, data is read from address "960". Here, data is not stored in the cache memory 31. Thus, it is determined that address "960" is a cache miss. Accordingly, a reading operation is performed on the main memory 13 using address "960". In accordance with the capacity of each line in the cache memory 31, the data of addresses "960" through "1023" is read from the main memory 13 and stored in the cache memory 31. In the cache memory 31, the data is stored as a single vertical line of the pixels 103 as illustrated in FIG. 11.

While the data of addresses "960" to "1023" is being read, a prefetch address based on the reference values m and n is generated. For example, the reference values m and n are each "8". In this case, a prefetch address of "961" is obtained based on the relationship between the count value CT and the address ADR. The prefetch address "961" is contained in the single line of data previously read from address "960" and is not stored as a prefetch address in the prefetch address buffer 35a (see FIG. 1). Thus, there is no meaning to the prefetching. The same applies until the prefetch address becomes "1023".

Thus, the next prefetch address is "448". In the same manner as described above, address "448" is determined as being a cache miss and stored in the prefetch address buffer 35a. Then, during the period unit the reading of the data of addresses "960" to "1023" is completed, a prefetch address is generated based on the reference value n and stored in the buffer 35a.

When the reading of the data in addresses "960" to "1023" is completed, the count value CT is updated to "1", and a read operation is performed on address "896". It is determined that address "896" is also a cache miss. Accordingly, a read operation is performed on the main memory 13, and data read from the main memory 13 is stored in the cache memory 31.

This processing is repeated until the processing of address "512" in the first line illustrated in FIG. 11 is completed. Then, the processing proceeds to the second line. Here, the address of the pixel at the head of the second line is "961", and the data of this address is required. However, due to the capacity limit (512 bytes) of the cache memory 31, the line in which the data previously read based on address "960" is rewritten by data read based on another address. Thus, a cache miss occurs at address "961". This rereads the data of addresses "960" to "1023".

Further, when the processing on the pixel at address "512" is completed, prefetch addresses are generated for addresses "448" to address "0" and cache determinations are made in FIG. 11. However, the processing for the data at these addresses is performed after the completion of processing of address "575" (middle in bottom line) in FIG. 11. In this manner, unnecessary processing is performed.

When rotating an image in this manner, it is apparent that the reference values m and n preferably are "1". When the reference values m and n are set to "1", during the processing of address "512" in FIG. 11, data of the pixels for the left half of FIG. 11 has been stored in the cache memory 31. Accordingly, addresses "961" to "575" are cache hits. This increases the processing speeded as compared to when the reference values m and n are set to "8".

In this manner, the reference values m and n are changed in correspondence with the processing. Thus, it is considered that the reference values m and n are set beforehand in accordance with the processing. However, when the setting of the cache memory 31 (number of lines, number of data pieces in one line) and the image size differ, it may be difficult to set the reference values m and n.

The cache control unit 32 of the present embodiment changes the reference values m and n corresponding to the cache hit rate and the cache miss rate. That is, the cache control unit 32 dynamically changes the reference values m and n corresponding to the cache hit rate and the cache miss rate. Accordingly, even when the processing or image size is different, the reference values m and n are dynamically changed, thereby increasing the processing speed.

Figure 13A:
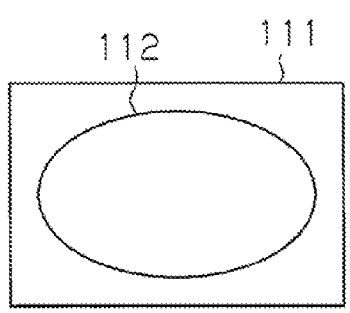
FIGS. 13A and 13B are diagrams illustrating processing for changing image data.
Figure 13B:
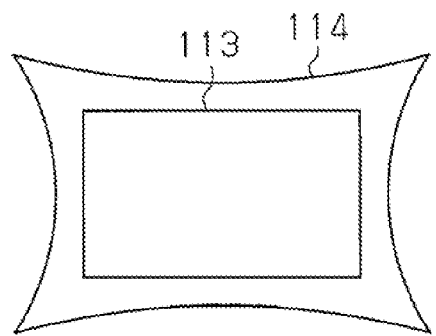

Another type of the processing is, for example, distortion correction. In contrast with an actual subject, an optical system such as a lens may cause an image to include a barrel-shaped or bobbin-shaped distortion. When such a distortion occurs, the central section of the image would conform to the subject. However, discrepancies from the actual subject would increase toward the peripheral portion. When correcting such a distortion, pixels may be moved more greatly as the periphery becomes closer. For example, when the image of a rectangular subject is captured, and a barrel-shaped distortion occurs in the captured image, as illustrated in FIG. 13A, an image 111 includes an elliptical subject 112. The image 111 is converted into a shape that is close to the original shape of the subject, namely, an image 114 that includes a rectangular subject 113 as illustrated in FIG. 13B.

Such correction processing includes a process for enlarging an image in the peripheral direction and another process for trimming required portions to obtain a corrected image. In the image enlargement process, data is read from the main memory 13 in accordance with the movement positions of pixels to generate image data including corrected pixels.

Figure 14:
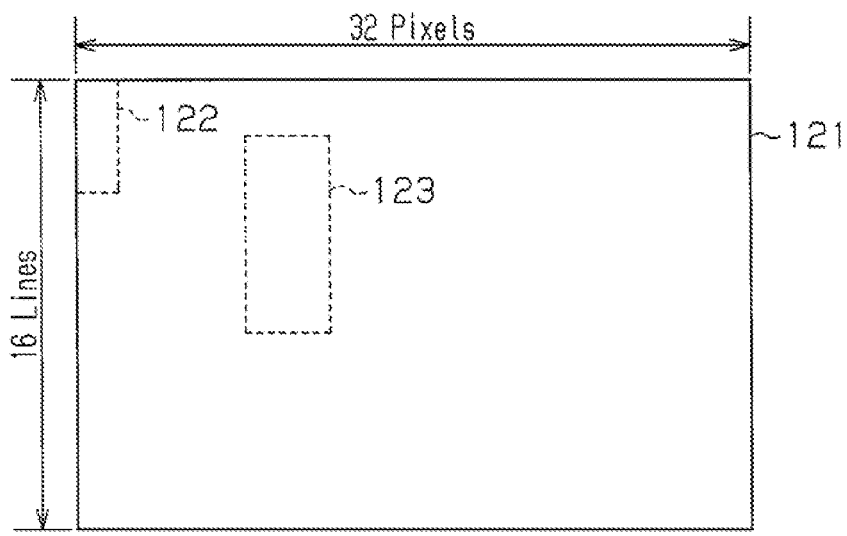
FIG. 14 is a diagram of an image subject to processing.

In a simplified model of the enlargement process, for as illustrated in FIG. 14, for an image 121, a process for enlarging pixels in a region 122 close to a corner of an image 121 by two times and a process keeping pixels in a central region 123 with the same size are performed. That is, as illustrated in FIG. 15, a corrected image is generated including a pixel 124 in the region 123 and an image 126 obtained by enlarging a pixel 125 in the region 122 by two times in the vertical and horizontal directions.

Figure 15:
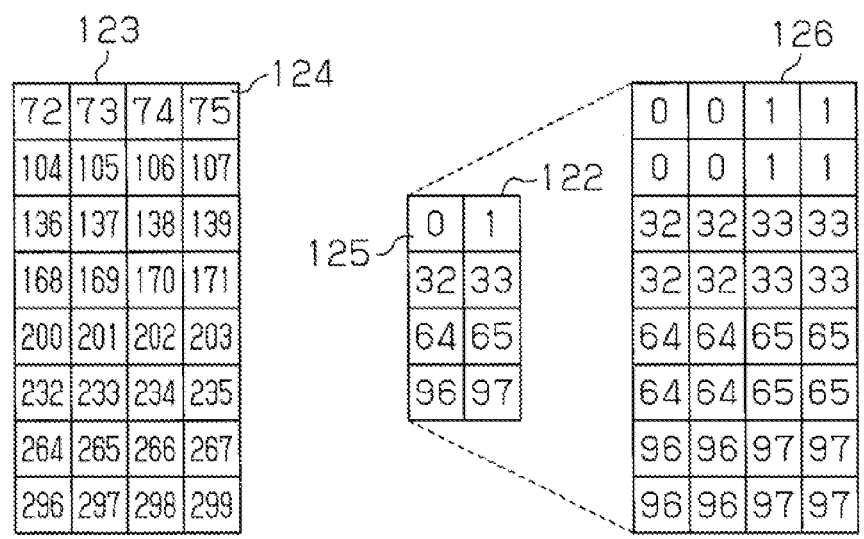
FIG. 15 is a diagram illustrating enlargement processing.

The numbers illustrated in FIG. 15 indicate pixel numbers that are added from the upper left pixel to the lower right pixel. The numbers correspond to addresses stored in the main memory 13. For example, when data is read from address "0", the data of the upper left pixel in the image 121, that is, the data of the pixel numbered "0" in FIG. 15 is read from the main memory 13.

The count values CT and addresses ADR for the distortion correction are illustrated in FIG. 16. FIG. 16A illustrates the count values CT and the addresses ADR used to read image data from the central region 123 (refer to FIG. 14). FIG. 16B illustrates the count values CT and addresses ADR used to read image data from the peripheral region 122 (refer to FIG. 14).

In FIGS. 16A and 16B, to facilitate understanding of the comparison between the pixels read from the two regions 122 and 123, the count value CT is indicated as "0" in correspondence with the read start address for each of the regions 122 and 123. Obviously, the count values CT differ from the values illustrated in FIG. 16A or 16B when continuously processing the entire image 121 illustrated in FIG. 14.

Subsequent to the reading of data from the pixels in the region 122 illustrated in FIG. 14, a process for reading the data of the pixels in the region 123 will be described with reference to FIGS. 17 to 19. For ease of description, the line size of the cache memory 31 illustrated in FIG. 2 corresponds to four pixels. Further, the number of addresses that may be stored in the prefetch address buffer is "4", and the number of cycles in which data is read from the main memory 13 is "8".

If the processing starts, the initialization process illustrated in FIGS. 6 and 7 is performed to set an initial value (for example, "4") for each of the reference values m and n.

Figure 17:
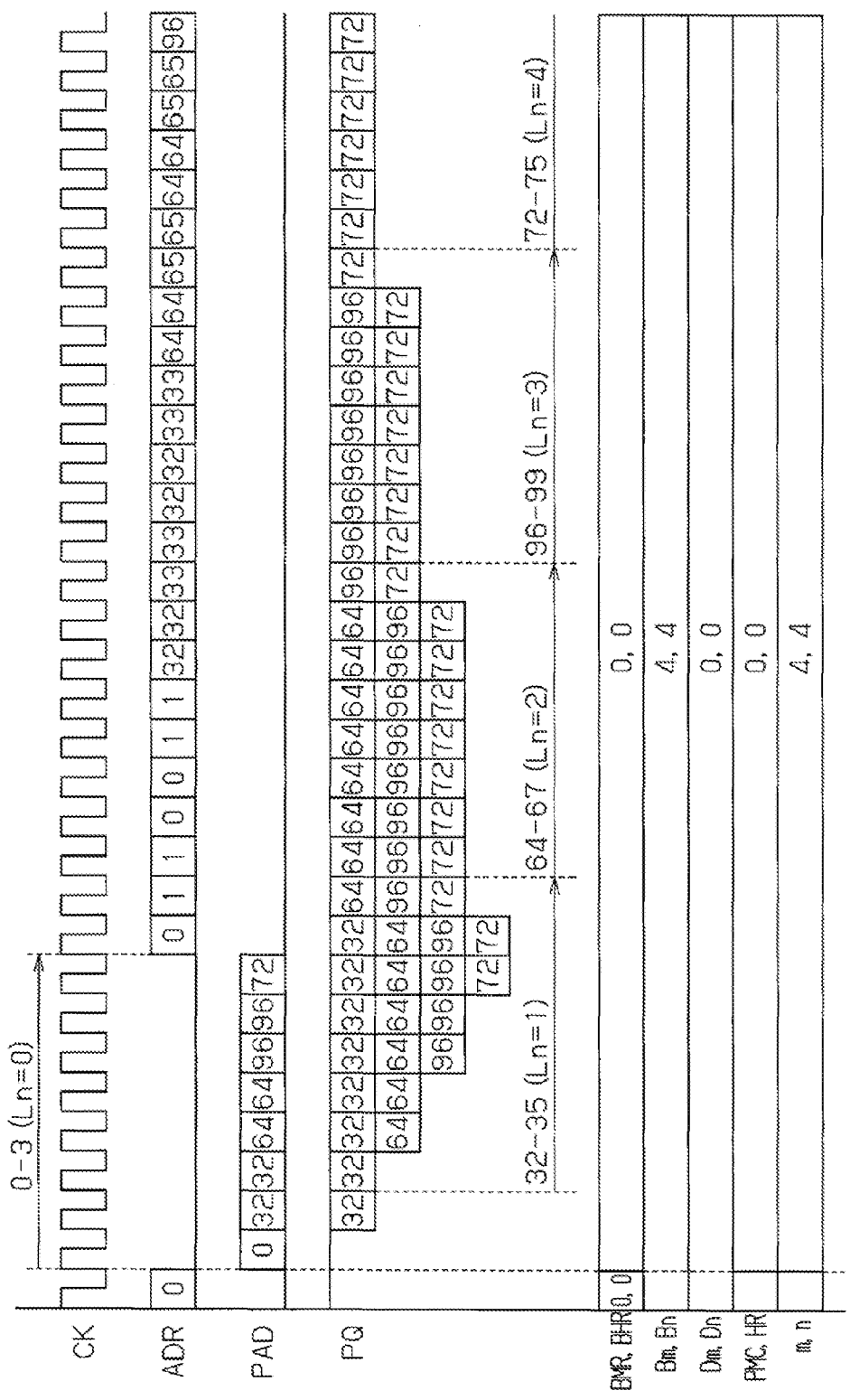
FIG. 17 is a chart illustrating the operation of the memory access determination circuit.

As illustrated in FIG. 17, first, data is read from address "0" based on the count value CT (=0). In this state, no data is stored in the cache memory 31. Thus, it is determined that address "0" is a cache miss. Accordingly, address "0" is used to read data from the main memory 13. That is, data in addresses "0" to "3" is read from the main memory 13 and written to the cache memory 31. The number of a line in which the data is written is Ln. That is, data is written to the number 0 line (Ln=0).

When data is being read from addresses "0" to "3", a prefetch address is generated using the reference values m and n. Here, the reference value m is "4". Thus, the count value CT is updated to "4", and address "0" is generated as a prefetch address PAD, as illustrated in FIG. 16B. The prefetch address "0" is included in the read addresses and is not stored in the buffer 35a illustrated in FIG. 1 as a prefetch address. Next, the count value CT is updated to "8" based on the reference value n (=4) to generate address "32" as the prefetch address PAD. Address "32" is not included in the addresses that are being read. Further, data corresponding to address "32" is not stored in the cache memory 31. Thus, it is determined that address "32" is a cache miss and stored in the buffer 35a (prefetch address queue PQ). Then, address "32" is used. This prefetches data from addresses "32" to "35" and writes the data to the cache memory 31 (Ln=1).

In the same manner, addresses "64" and "96" are generated as the prefetch addresses PAD and stored in the buffer 35a. As described above, data for the region 122 and data for the region 123 illustrated in FIG. 14 are continuously read. Thus, when the count value CT becomes "32", the data in the region 123, that is, address "72" when the count value CT illustrated in FIG. 16A is "0" is generated as the prefetch address. In the same manner as described above, address "72" is determined as being a cache miss and stored in the buffer 35a.

Then, the prefetch processing is sequentially performed on addresses "64", "96", and "72" after the preceding prefetch processing is completed. That is, when the prefetch processing on address "32" is completed, address "64" becomes the first address stored in the buffer 35a, which is of the FIFO type. Thus, the prefetch processing is performed using address "64".

When data is read from addresses "0" to "3", based on a count value CT counted by the reference value f (=1), the pixel data is read from the cache memory 31 and provided to the data processing unit 21 (refer to FIG. 1).

Figure 18:
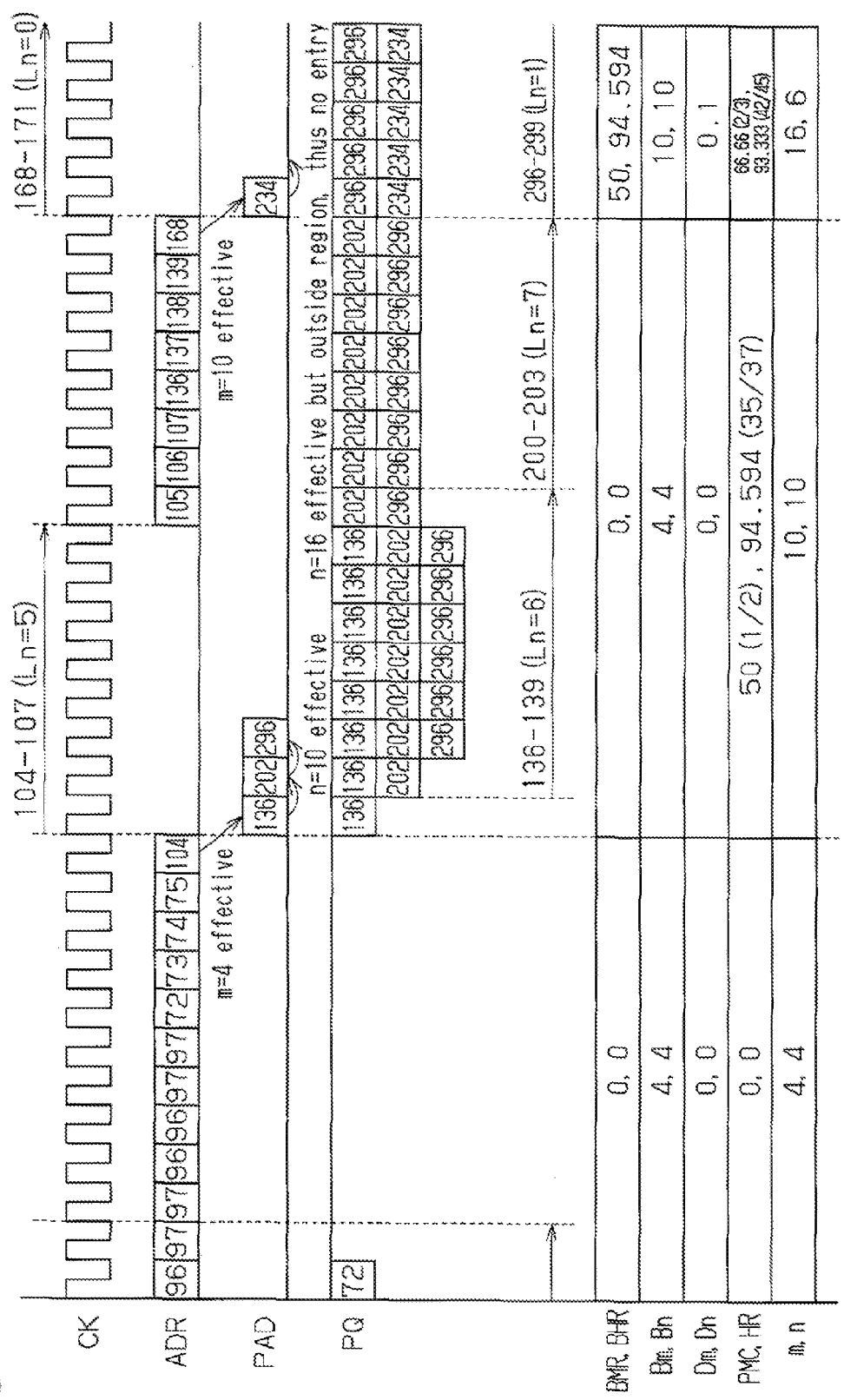
FIG. 18 is a chart illustrating the operation of the memory access determination circuit.

Then, as illustrated in FIG. 18, when data is read using address "104" (count value CT=4 in FIG. 16A), data of address "104" is not stored in the cache memory 31 and thus determined as a cache miss. Accordingly, data is read from the main memory 13 using address "104". Then, address "136" (count value CT=8 in FIG. 16A) is generated using the reference value m (=4). Address "136" is determined as being a cache miss and stored in the buffer 35a (see FIG. 1).

The occurrence of a cache miss causes the reference value calculation unit 49 illustrated in FIG. 2 to change the reference values m and n. Here, the count value MC of the miss counter 45 is "2", and the count value PMC of the prefetch miss counter 46 is "1". Accordingly, the miss rate MR is "50%". Further, the count value HC of the hit counter 42 is "35", and the count value AC of the access counter 41 is "37". Thus, the hit rate HR is "94.594%". In this state, the before hit rate BHR and the before miss rate BMR are both "0%". Accordingly, the reference value calculation unit 49 sets the reference values m and n to "10, 10" in accordance with the selection method illustrated in FIGS. 6B and 7B.

As a result, based on the reference value n (=10), address "202" (count value CT=18 in FIG. 16A) is generated. The address "202" is determined as being a cache miss and stored in the buffer 35a (see FIG. 1). In the same manner, based on the reference value n (=10), address "296" is generated and stored in the buffer 35a.

In the same manner, when determined that the generated address "168" is a cache miss, the reference value calculation unit 49 illustrated in FIG. 2 sets the next reference values m and n to "16, 6" by using the hit rate HR or the like. In the present example, the amount of data in each of the regions 122 and 123 is small. Thus, the addresses corresponding to the changed reference values m and n are not contained in the regions 122 and 123. Thus, entry of prefetch addresses is not instructed.

Figure 19:
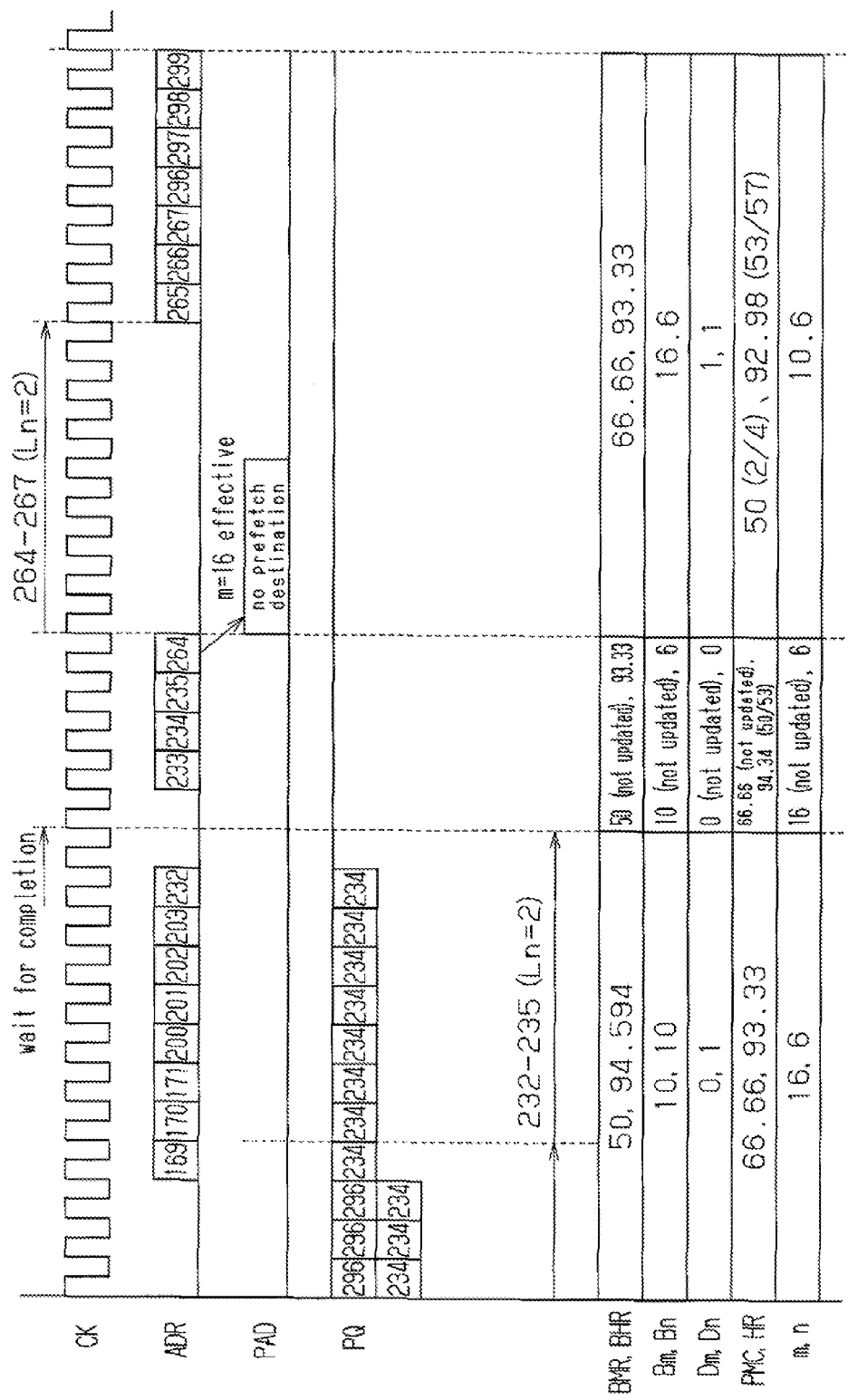
FIG. 19 is a chart illustrating the operation of the memory access determination circuit.

As illustrated in FIG. 19, when data is read using address "232", data in address "232" is not stored in the cache memory 31. Thus, address "232" is determined as being a cache miss. The occurrence of the cache miss causes the reference value calculation unit 49 illustrated in FIG. 2 to set the reference values m and n to "16, 6" based on the hit rate HR and the like. Since data is being read from addresses "232" to "235", address "232" is not stored in the buffer 35a. Further, a prefetch address generated based on the cache miss is outside the region, that is, there is no prefetch destination in the present example.

Further, when data is read using address "264", data in the address "264" has not been stored in the cache memory 31. Thus, address "264" is determined as being a cache miss. Then, data in addresses "264" to "267" is read from the main memory 13 and written to the cache memory 31. The occurrence of the cache miss causes the reference value calculation unit 49 illustrated in FIG. 2 to set the reference values m and n to "10, 6" based on the hit rate HR and the like. A prefetch address generated based on a cache miss is outside the region, that is, there is no prefetch destination in the present example.

Then, when data is read using address "298", data of address "298" is stored in the cache memory 31 (right end in FIG. 18). Thus, address "298" is determined as being a cache hit. Accordingly, the data stored in the cache memory 31 is output to the data processing unit 21. Then, when the data in address "299" is output, the processing on the regions 122 and 123 illustrated in FIG. 14 is completed.

Next, an example of processing when the reference values m and n are not changed will be described.

Figure 20:
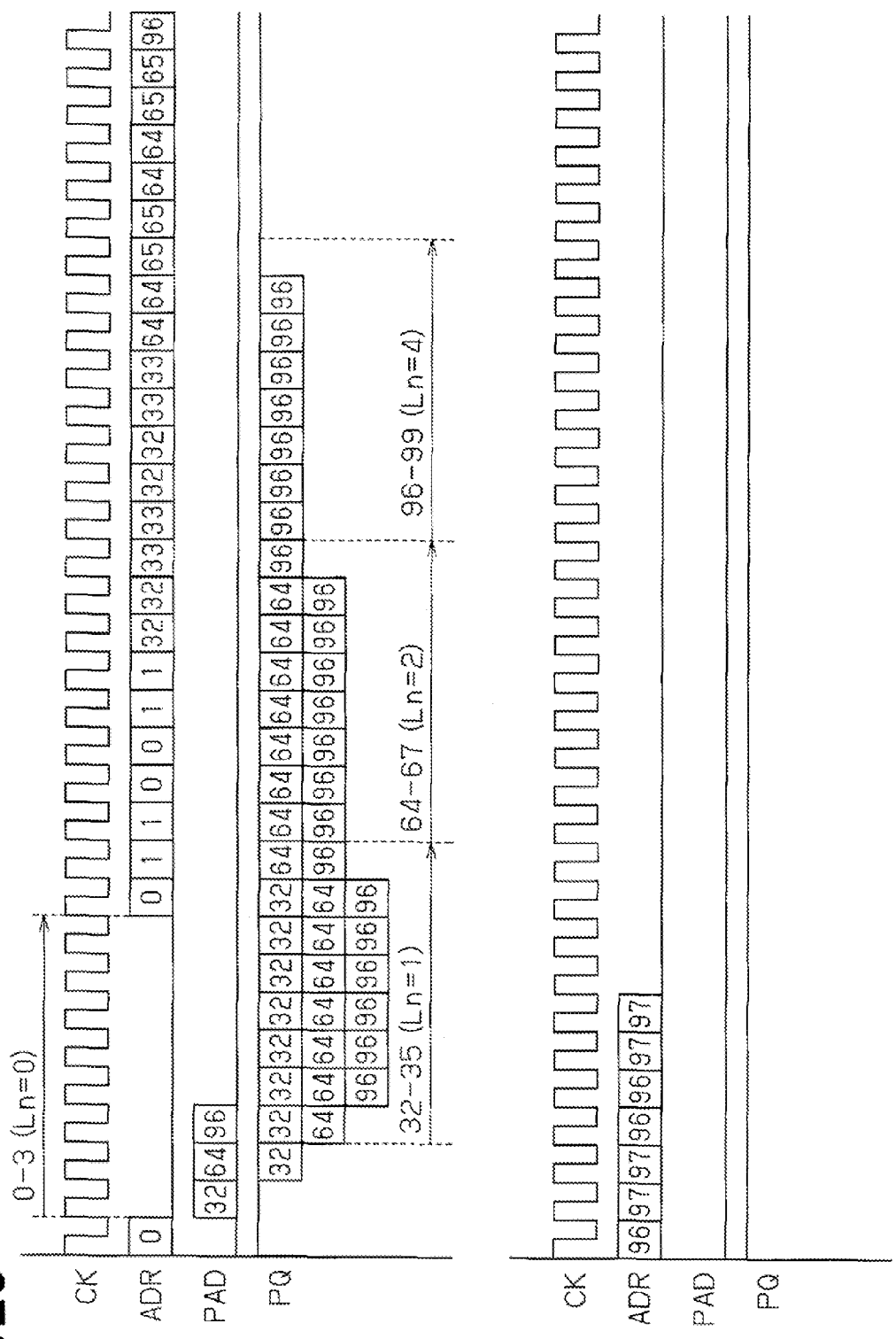
FIG. 20 is a chart illustrating the operation of a comparison example.
Figure 21:
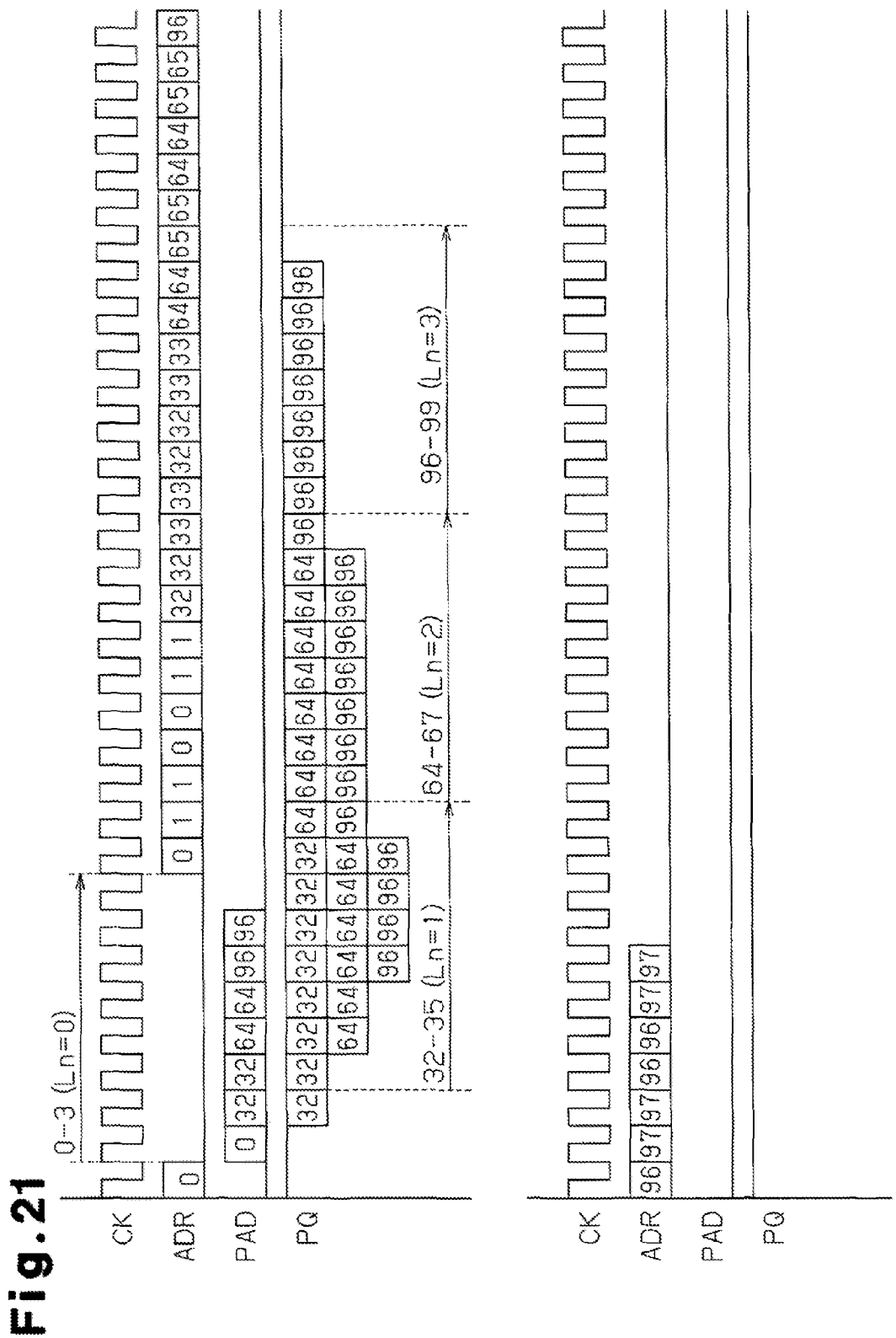
FIG. 21 is a chart illustrating the operation of a comparison example.
Figure 22:
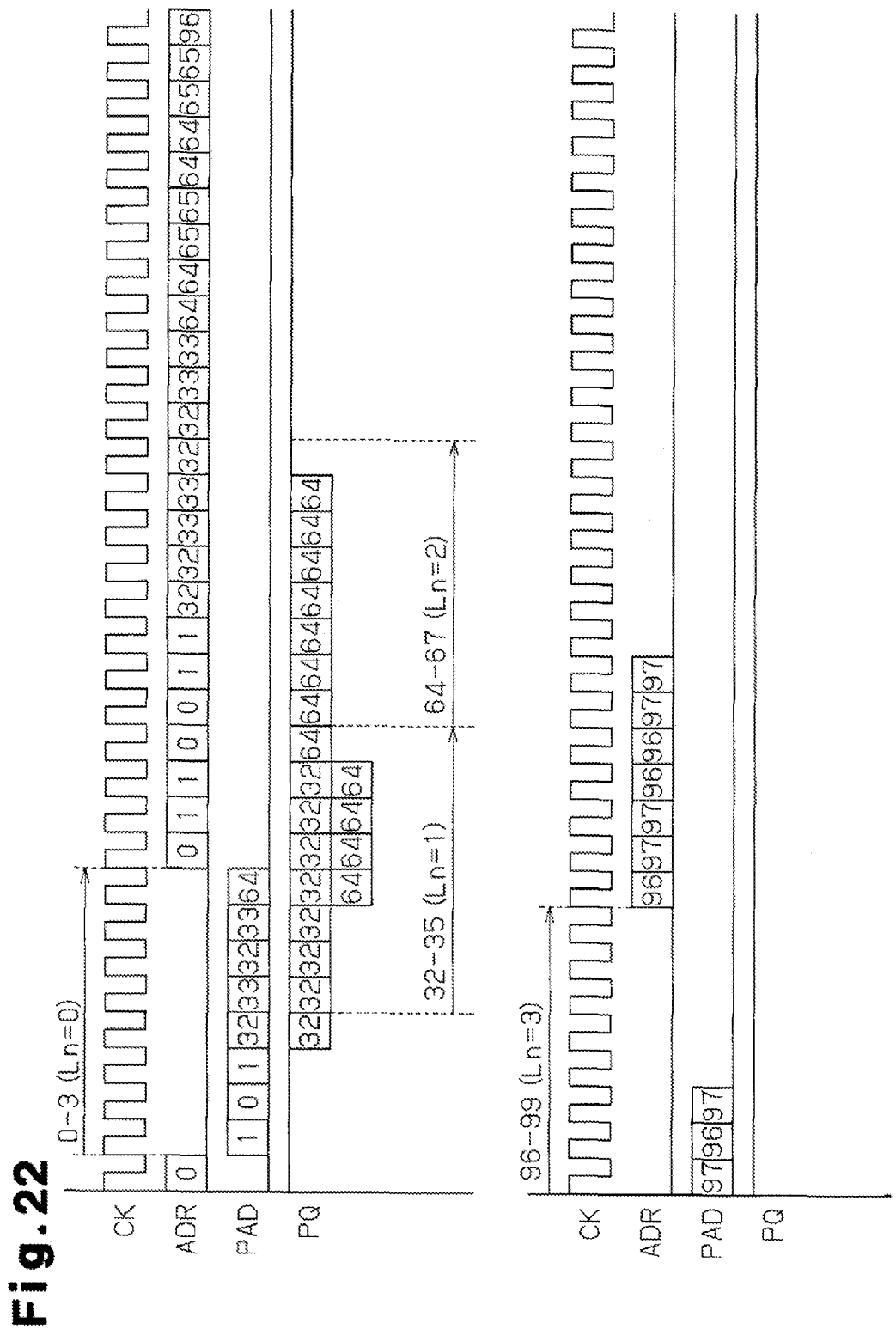
FIG. 22 is a chart illustrating the operation of a comparison example.

FIGS. 20 to 22 illustrate some cases for processing the peripheral region 122 illustrated in FIG. 14. For example, FIG. 20 illustrates the processing when the reference values m and n are set to "8, 8", FIG. 21 illustrates the processing when the reference values m and n are set to "4, 4", and FIG. 22 illustrates the processing when the reference values m and n are set to "2, 2".

Figure 23:
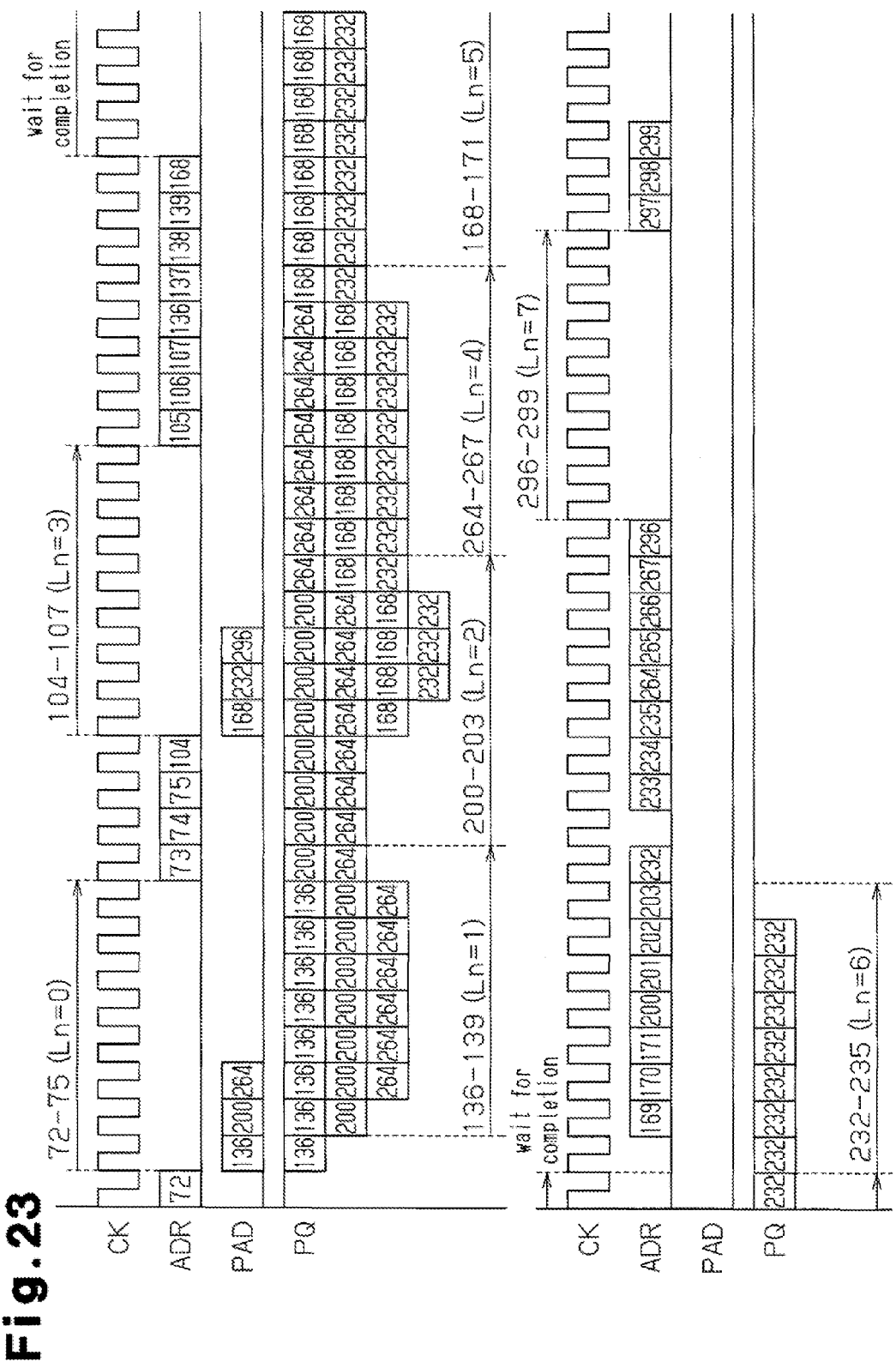
FIG. 23 is a chart illustrating the operation of a comparison example.
Figure 24:
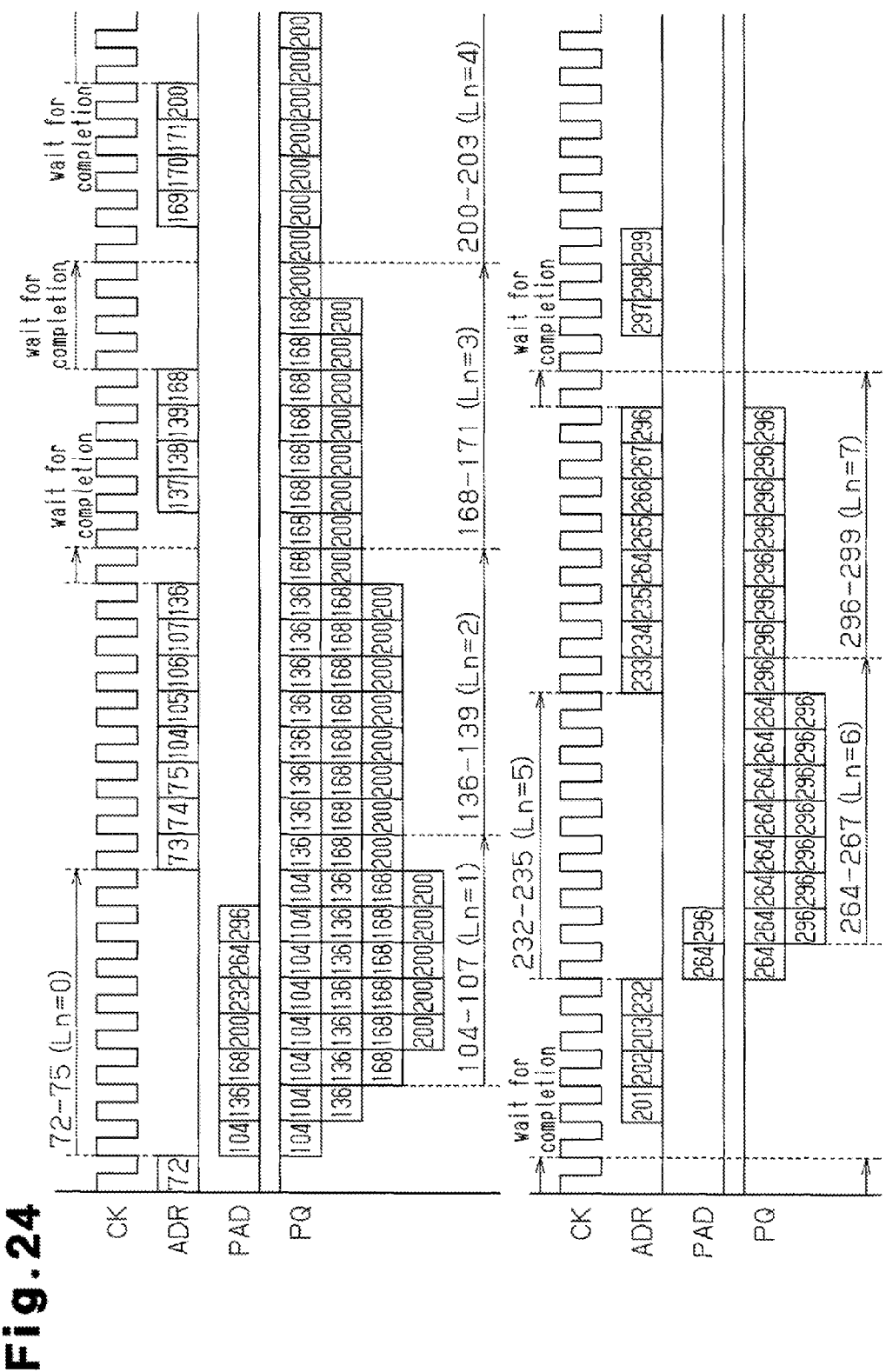
FIG. 24 is a chart illustrating the operation of a comparison example.

FIGS. 23 to 25 illustrate some cases for processing the central region 123 illustrated in FIG. 14. For example, FIG. 23 illustrates the processing when the reference values m and n are set to "8, 8", FIG. 24 illustrates the processing when where the reference values m and n are set to "4, 4", and FIG. 25 illustrates the processing when the reference values m and n are set to "2, 2".

When processing the region 122, as apparent from FIGS. 20 to 22, the reference values m and n are set to "8, 8" or "4, 4". When processing the region 123, as apparent from FIGS. 23 to 25, the reference values m and n are set to "4, 4". Further, in the image 121 illustrated in FIG. 14, in portions outside the regions 122 and 123, the optimal reference values m and n may differ from the above value ("4, 4"). That is, when the reference values m and n are not changed, the optimal reference values m and n may be set throughout the image 121.

In contrast, in the present embodiment, as illustrated in FIGS. 17 to 19, the reference values m and n are dynamically changed in accordance with the hit rate or miss rate calculated by reading the data. Accordingly, it may be not necessary to set the reference values m and n throughout the image 121 illustrated in FIG. 14 beforehand. Namely, the reference value calculation unit 49 changes the reference values m and n based on a hit rate HR and a prefetch address miss rate MR in the cache memory 31. Thus, the hit rate HR is maintained at a high value.

Figure 12:
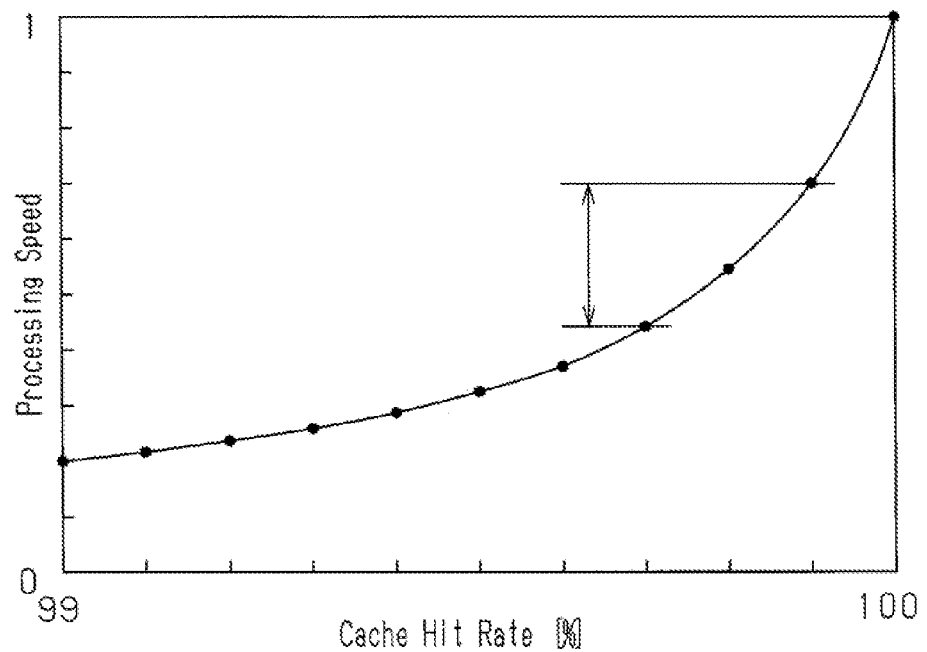
FIG. 12 is a characteristic graph illustrating the relationship between a cache hit rate and processing speed.

FIG. 12 is a characteristic graph illustrating the relationship between the cache hit rate and the processing speed.

The cache hit rate is a value taken when the read latency value is 100 cycles. The processing speed is normalized so that "1" is represented as the highest speed. As apparent from FIG. 12, an increase in the hit rate increases the processing speed. Further, a slight increase in the hit rate (for example, 0.2% in FIG. 12), increases the processing speed by approximately 1.5 times. Thus, by changing the reference values m and n to increase the hit rate like in the present embodiment, the data processing speed is increased. That is, the data processing time is shortened.

The above embodiment has the advantages described below.

(1) An address is generated in correspondence with a value counted based on the reference value f. This increases the speed of cache determination on continuous data. Accordingly, the processing speed is increased for continuous data.

(2) When a cache miss occurs and the main memory 13 is being accessed, an address corresponding to a value counted based on the reference values m and n is stored in the buffer 35a as a prefetch address PAD. Then, after the accessing of the main memory 13 due to the occurrence of the cache miss is completed, the data corresponding to the prefetch address PAD is read from the main memory 13 and stored in the cache memory 31. This increases the probability of a cache hit in the subsequent cycles. Accordingly, the processing speed is increased for continuous data.

(3) The reference values m and n are changed dynamically in accordance with the cache determination performed on an address ADR that corresponds to a count value CT. Thus, an address is by the reference values m and n, which correspond to the processing and reading of data. Accordingly, the data processing speed is increased.

(4) The reference values m and n are dynamically changed. Thus, the optimal reference values m and n do not need to be set beforehand and the cache hit rate may be increased. This allows the performance of the cache 12 to be increased.

(5) A hit rate HR and a prefetch address miss rate MR in the cache memory are calculated, and the reference values m and n are changed to increase the hit rate HR and prefetch address miss rate MR. Thus, a high cache hit rate is maintained, and the data processing speed is increased.

It should be apparent to those skilled in the art that the invention may be embodied in many other specific forms without departing from the spirit or scope of the invention. Particularly, it should be understood that the invention may be embodied in the following forms.

In the above embodiment, the reference values m and n are changed to different values but may be changed to have the same value. For example, when the reference value m is changed to "10", the reference value n is also changed to "10". This would also dynamically change the reference values m and n in accordance with the processing and reduce the processing time.

In the above embodiment, when the wait signal WT is not asserted, that is, when there is a cache hit, the counter unit 22 generates the count value CT based on the fixed value of "1". However, the fixed value may be changed in accordance with the structure of the data processing unit 21 and the size of data (the number of bits per processed unit).

In the configuration of the above embodiment (refer to FIGS. 1 and 2), a memory controller may be arranged between the cache 12 and the main memory 13.

In the above embodiment, the reference values m and n are changed using the reference value table 49a in the reference value calculation unit 49. However, the reference values m and n may be selected from different tables.

In the above embodiment, the reference values in the counter unit 22 are changed in response to the wait signal WT. Instead, the counter unit 22 may change the reference values based on another control signal, such as a signal that requests the generation of a prefetch address.

In contrast to the above embodiment, the cache 12 may provide the counter unit 22 with changed values.

All examples and conditional language recited herein are intended for pedagogical purposes to aid the reader in understanding the principles of the invention and the concepts contributed by the inventor to furthering the art, and are to be construed as being without limitation to such recited examples and conditions, nor does the organization of such examples in the specification relate to a showing of the superiority and inferiority of the invention. Although the embodiments of the invention has been described, it should be understood that the various changes, substitutions, and alterations could be made hereto without departing from the spirit and scope of the invention.

The invention claimed is:

1. A memory access determination circuit comprising:
a counter that generates a count value based on one of a first reference value, a second reference value, and a third reference value;
a controller that performs a cache determination based on an address corresponding to the count value and generates a control signal in accordance with the cache determination, wherein the controller is configured to assert the control signal when the cache determination indicates a cache miss; and
a changing unit that changes the second reference value and the third reference value in accordance with the cache determination,
wherein the counter is configured to
select the first reference value when the control signal is being negated,
select the second reference value in a first cycle when the control signal is being asserted, and
select the third reference value in a cycle following the first cycle when the control signal is being asserted.

2. The memory access determination circuit according to claim 1, wherein the changing unit includes a hit rate calculation unit, which calculates a cache hit rate based on the cache determination, and changes the second reference value based on the cache hit rate.

3. The memory access determination circuit according to claim 2, wherein the hit rate calculation unit calculates a cache miss rate based on the cache determination indicating that a cache miss has occurred at an address corresponding to the count value generated in accordance with the second reference value.

4. The memory access determination circuit according to claim 1, wherein:
the changing unit calculates a cache miss rate based on the cache determination indicating that a cache miss has occurred at an address corresponding to the count value generated in accordance with the second reference value and changes the reference value for generating the first address based on the cache miss rate; and
the changing unit calculates a cache hit rate based on the cache determination and changes the reference value for generating the second address based on the cache hit rate.

5. The memory access determination circuit according to claim 1, wherein the changing unit calculates a cache hit rate based on the cache determination and changes the second reference value, based on the calculated cache hit rate and a previously calculated and held cache hit rate, to increase a subsequent cache hit rate.

6. The memory access determination circuit according to claim 1, wherein when the cache determination indicates the cache miss, the controller performs prefetching on a main memory by using the address corresponding to the count value as a prefetch address, and the controller stores data read from the main memory in a cache memory.

7. The memory access determination circuit according to claim 1, wherein the counter
holds the count value generated in accordance with the first reference value when the cache determination indicates the cache miss, and
switches the count value generated in accordance with the second reference value to the count value generated and held in accordance with the first reference value in correspondence with an accessing situation of the main memory based on an address determined as the cache miss.

8. A cache controller comprising:
a cache determination unit that performs a cache determination, based on an address corresponding to a count value output from a counter in accordance with one of a first reference value, a second reference value, and a third reference value, and outputs a control signal, wherein
the cache determination unit is configured to assert the control signal when the cache determination indicates a cache miss, and the counter is configured to
- select the first reference value when the control signal is being negated,
- select the second reference value in a first cycle when the control signal is being asserted, and
- select the third reference value in a cycle following the first cycle when the control signal is being asserted; and a changing unit that changes the second reference value and the third reference value so that a cache hit rate increases when the cache determination indicates the cache miss.

9. The cache controller according to claim 8, wherein:
the changing unit changes the first value based on a cache miss rate calculated upon occurrence of the cache miss and changes the second value based on a cache hit rate calculated upon the occurrence of the cache miss.

10. A method for determining memory access, the method comprising:
- switching between a first reference value, a second reference value, and a third reference value in accordance with a control signal;
- generating a count value based on one of the first to third reference values;
- performing a cache determination based on an address corresponding to the count value;
- generating the control signal in accordance with the cache determination, wherein the generating the control signal includes asserting the control signal when the cache determination indicates a cache miss;
- selecting the first reference value when the control signal is being negated;
- selecting the second reference value in a first cycle when the control signal is being asserted;
- selecting the third reference value in a cycle following the first cycle when the control signal is being asserted; and
- changing the second reference value and the third reference value in accordance with the cache determination.

11. The method according to claim 10, wherein:
the second reference value includes a first value and a second value that are selectively used when the cache determination indicates the cache miss; and
the changing the second reference value includes:
- changing the first value based on a cache miss rate calculated upon occurrence of the cache miss; and
- changing the second value based on a cache hit rate calculated upon the occurrence of the cache miss.

12. An electronic device comprising:
a main memory;
a cache memory that operates at a higher speed than the main memory;
a counter that generates a count value based on one of a first reference value, a second reference value, and a third reference value;
a controller that performs a cache determination based on an address corresponding to the count value and generates a control signal in accordance with the cache determination, wherein the controller is configured to assert the control signal when the cache determination indicates a cache miss; and
a changing unit that changes the second reference value and the third reference value in accordance with the cache determination,
wherein the counter is configured to
- select the first reference value when the control signal is being negated,
- select the second reference value in a first cycle when the control signal is being asserted, and
- select the third reference value in a cycle following the first cycle when the control signal is being asserted.

* * * * *